US006927786B2

(12) United States Patent
Silverbrook

(10) Patent No.: US 6,927,786 B2
(45) Date of Patent: Aug. 9, 2005

(54) INK JET NOZZLE WITH THERMALLY OPERABLE LINEAR EXPANSION ACTUATION MECHANISM

(75) Inventor: Kia Silverbrook, Balmain (AU)

(73) Assignee: Silverbrook Research PTY LTD, Balmain (AU)

(*) Notice: Subject to any disclaimer, the term of this patent is extended or adjusted under 35 U.S.C. 154(b) by 52 days.

(21) Appl. No.: 10/698,360

(22) Filed: Nov. 3, 2003

(65) Prior Publication Data

US 2005/0073554 A1 Apr. 7, 2005

Related U.S. Application Data

(63) Continuation-in-part of application No. 10/160,273, filed on Jun. 4, 2002, now Pat. No. 6,746,105, which is a continuation of application No. 09/112,767, filed on Jul. 10, 1998, now Pat. No. 6,416,167.

(30) Foreign Application Priority Data

Jul. 15, 1997 (AU) .............................................. PO7991
Mar. 25, 1998 (AU) .............................................. PP2592

(51) Int. Cl.[7] ................................................. B41J 2/04
(52) U.S. Cl. ................................................. 347/54 B
(58) Field of Search ............................ 347/20, 44, 47, 347/54, 56, 63, 65, 67; 60/527–529

(56) References Cited

U.S. PATENT DOCUMENTS

| 1,941,001 A | 1/1933 | Hansell ....................... 346/97 |
| 3,373,437 A | 3/1968 | Sweet et al. .................. 347/74 |
| 3,596,275 A | 7/1971 | Sweet ........................... 347/74 |

(Continued)

FOREIGN PATENT DOCUMENTS

| DE | 1 648 322 | 3/1971 |
| DE | 29 05 063 | 8/1980 |
| DE | 32 45 283 | 8/1984 |

(Continued)

OTHER PUBLICATIONS

Noworolski, J. Mark et al, "Process for in–plane and out–of–plane single–crystal–slicon thermal microactuators". Sensors and Actuators, A, CH, Elsevier–Sequoia S.A., Lausanne, vol. 55, No. 1, Jul. 15, 1996, pp 65–69, XP004077979 ISSN: 0924–4247.*

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp 146–150, XP000443412, ISSN: 1057–7157.*

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp 142–147, XP000528408, ISBN: 0–7803–1834–X.*

Primary Examiner—Juanita D. Stephens

(57) ABSTRACT

A nozzle arrangement including a nozzle chamber for holding ink, and a dynamic structure having: a lever arm; and an operative portion in fluid communication with the nozzle chamber. The dynamic structure is mounted for rotational movement above a pivot axis with respect to the nozzle chamber upon actuation. An actuator extends between the lever arm and an anchor point, and has a predetermined length in a quiescent state prior to actuation. Upon actuation, the length of the actuator changes such that the actuator applies a force between the lever arm and the anchor to cause rotational movement of the dynamic structure, which in turn causes ejection of the ink from a fluid ejection port.

8 Claims, 33 Drawing Sheets

U.S. PATENT DOCUMENTS

| | | | |
|---|---|---|---|
| 3,683,212 A | 8/1972 | Zoltan | 310/328 |
| 3,747,120 A | 7/1973 | Stemme | 347/70 |
| 3,946,398 A | 3/1976 | Kyser et al. | 347/70 |
| 4,423,401 A | 12/1983 | Mueller | 337/104 |
| 4,459,601 A | 7/1984 | Howkins | 347/68 |
| 4,490,728 A | 12/1984 | Vaught et al. | 347/60 |
| 4,553,393 A | 11/1985 | Ruoff | 60/528 |
| 4,584,590 A | 4/1986 | Fischbeck et al. | 347/69 |
| 4,672,398 A | 6/1987 | Kuwabara et al. | 347/48 |
| 4,737,802 A | 4/1988 | Mielke | 347/54 |
| 4,864,824 A | 9/1989 | Gabriel et al. | 60/527 |
| 4,899,181 A | 2/1990 | Hawkins et al. | 347/63 |
| 5,029,805 A | 7/1991 | Albarda et al. | 251/11 |
| 5,258,774 A | 11/1993 | Rogers | 347/40 |
| 5,666,141 A | 9/1997 | Matoba et al. | 347/54 |
| 5,719,604 A | 2/1998 | Inui et al. | 347/54 |
| 6,416,167 B1 | 7/2002 | Silverbrook | 347/54 |
| 6,540,332 B2 * | 4/2003 | Silverbrook | 347/54 |

FOREIGN PATENT DOCUMENTS

| | | |
|---|---|---|
| DE | 34 30 155 | 2/1986 |
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0 634 273 | 1/1995 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 007 162 | 5/1979 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 2-265752 | 10/1990 |
| JP | 03 65348 | 3/1991 |
| JP | 03 112662 | 5/1991 |
| JP | 03 180350 | 8/1991 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05 284765 | 10/1993 |
| JP | 05 318724 | 12/1993 |
| JP | 6-91866 | 4/1994 |
| JP | 6-91885 | 4/1994 |
| JP | 07 314665 | 12/1995 |
| WO | WO 94 18010 | 8/1994 |
| WO | WO 97 12689 | 4/1997 |

* cited by examiner

INK JET NOZZLE WITH THERMALLY OPERABLE LINEAR EXPANSION ACTUATION MECHANISM

The present application is a continuation-in-part of U.S. application Ser. No. 10/160,273 filed on Jun. 4, 2002, now issued as U.S. Pat. No. 6,746,105, which is a continuation of U.S. application Ser. No. 09/112,767 filed on Jul. 10, 1998, now issued as U.S. Pat. No. 6,416,167, the entire contents of which are herein incorprated by reference.

FIELD OF INVENTION

The present invention relates to a nozzle arrangement for a microelectromechnical system ('MEMS') inkjet printhead.

BACKGROUND OF THE INVENTION

In the MEMS nozzle arrangement described in U.S. Pat. No. 6,243,113 "Image Creation Method and Apparatus" (the contents of which are incorporated herein by cross reference), an ink chamber is provided with an ink inlet and an ink ejection port, which are coaxial. The ink ejection port is provided through thermal actuator that incorporates a paddle mounted to a substrate by a passive anchor and an active anchor. The active anchor includes a resistive element that heats up upon application of a current. This heating causes expansion of the active anchor, whilst the passive anchor is sufficiently shielded from the generated heat that it remains the same length. The change in relative lengths of the anchors is amplified by the geometric position of the anchors with respect to each other, such that the paddle can selectively be displaced with respect to the ink chamber by applying a suitable drive current to the active anchor.

Upon actuation, the paddle is urged towards the ink chamber, causing an increase in pressure in the ink in the chamber. This in turn causes ink to bulge out of the ink ejection port. When the drive current is removed, the active anchor quickly cools, which in turn causes the paddle to return to its quiescent position. The inertia of the moving ink bulge causes a thinning and breaking of the ink surface adjacent the ink ejection port, such that a droplet of ink continues moving away from the port as the paddle moves back to its quiescent position. As the quiescent position is reached, surface tension of a concave meniscus across the ink ejection port causes ink to be drawn in to refill the ink chamber via the ink inlet. Once the ink chamber is full, the process can be repeated.

One difficulty with the arrangement described in this nozzle arrangement (and similar systems) is balancing the compressive and bend loads on the active anchor. If the anchor is made too stiff relative to the force it can exert during self-heating, then it will not bend and the operative end of the paddle will not move sufficiently to eject ink. Alternatively, if the stiffness is too low, then energy will be wasted in bending the anchor. Even if the stiffness of the anchor is correct in a particular design, the energy lost to bending the active and passive anchors cannot be recovered. It would be desirable to provide an arrangement which does not rely on bend actuation as its primary provider of force to a paddle or other actuator.

SUMMARY OF INVENTION

In accordance with the invention, there is provided a nozzle arrangement for an inkjet printhead, the nozzle arrangement including:

(a) a nozzle chamber for holding ink;

(b) a dynamic structure having: a lever arm; and an operative portion in fluid communication with the nozzle chamber, the dynamic structure being mounted for rotational movement about a pivot axis with respect to the nozzle chamber upon actuation;

(c) a fluid ejection port in fluid communication with the nozzle chamber for allowing ejection of ink upon movement of the dynamic structure relative to the nozzle chamber during actuation;

(d) an actuator extending between the lever arm and an anchor point, and having a predetermined length in a quiescent state prior to actuation;

the nozzle arrangement being configured such that, upon actuation, the length of the actuator changes such that the actuator applies a force between the lever arm and the anchor to cause rotational movement of the dynamic structure, which in turn causes ejection of the ink from the fluid ejection port.

Preferably, the fluid ejection port is formed in a roof portion that at least partially defines the nozzle chamber, the nozzle arrangement being configured such that, upon actuation, the operative portion of the dynamic structure is moved relative to the fluid ejection port, thereby causing ejection of the ink from the fluid ejection port.

In a preferred form, the operative portion of the actuator defines a roof portion that at least partially defines the nozzle chamber and the fluid ejection port is formed in the roof portion. In this embodiment, the nozzle arrangement is configured such that, upon actuation, the roof portion, and thereby the fluid ejection port, are moved relative to the nozzle chamber, thereby causing the ink to be ejected from the fluid ejection port.

It is also preferred that, upon return of the actuator to a quiescent position after actuation and ejection of the ink through the fluid ejection port, the nozzle chamber is refilled with the ink via an inlet channel. More preferably, the nozzle chamber is refilled with ink from the inlet channel due to a reduction in pressure within the nozzle chamber caused by surface tension of a concave ink meniscus across the fluid ejection port after ink ejection.

In a particularly preferred form of the invention, the actuator is a thermal actuator. More preferably, the actuator comprises at least one active beam that is resistively heatable by means of an electric current, thereby to generate the force by way of thermal expansion.

Preferably, the nozzle arrangement further includes a lever arm support connected between a substrate and the lever arm.

Other preferred aspects, features and embodiments of the invention are described in the detailed description below.

BRIEF DESCRIPTION OF THE DRAWINGS

A preferred embodiment of the invention will now be described, by way of example only, with reference to the accompanying drawings, in which.

DETAILED DESCRIPTION OF THE DRAWINGS

Figure 1:
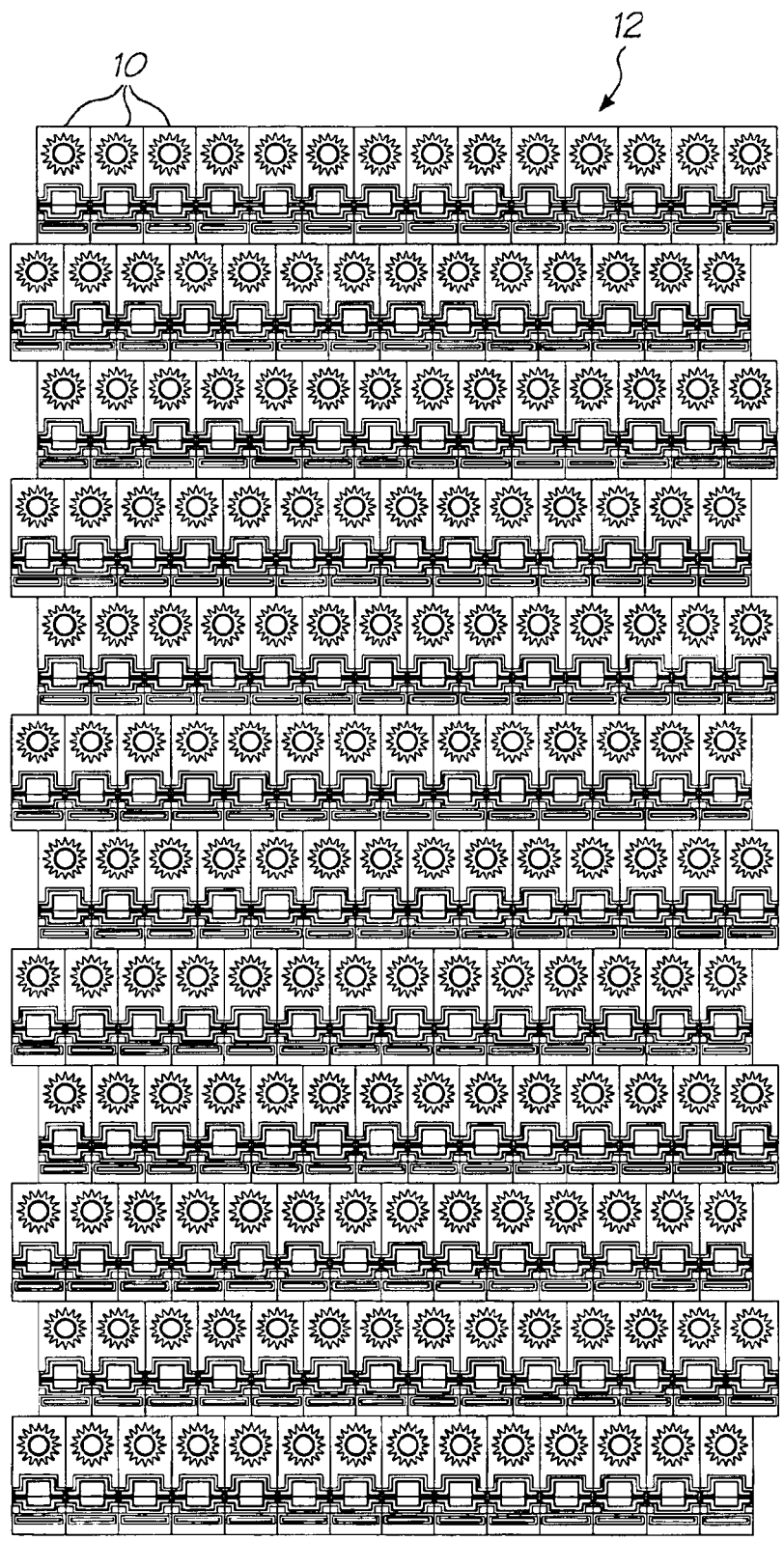
FIG. 1 shows a plan view of an ink jet printhead chip of the invention.

In FIGS. 1 to 9, reference numeral 10 generally indicates a nozzle arrangement for an ink jet printhead chip 12, part of which is shown in FIG. 1.

The nozzle arrangement 10 is the product of an integrated circuit fabrication technique. In particular, the nozzle arrangement 10 defines a micro-electromechanical system (MEMS).

In this description, only one nozzle arrangement 10 is described. This is simply for clarity and ease of description. A printhead having one or more printhead chips 12 can incorporate up to 84000 nozzle arrangements 10. Further, as is clear from FIG. 1, the printhead chip 12 is a multiple replication of the nozzle arrangement 10. Thus, the following detailed description of the nozzle arrangement 10 and the manner of its fabrication adequately describes the printhead chip 12.

The ink jet printhead chip 12 includes a silicon wafer substrate 14. 0.35 Micron 1 P4M 12 volt CMOS microprocessing circuitry is positioned on the silicon wafer substrate 14. The circuitry is shown as a drive circuitry layer 16.

A silicon dioxide or glass layer 18 is positioned on the wafer substrate 14. The layer 18 defines CMOS dielectric layers. CMOS top-level metal defines a pair of aligned aluminum electrode contact layers 20 positioned on the silicon dioxide layer 18. Both the silicon wafer substrate 14 and the silicon dioxide layer 18 are etched to define an ink inlet channel 22 having a rectangular cross section. An aluminum diffusion barrier 24 of CMOS metal 1, CMOS metal 2/3 and CMOS top level metal is positioned in the silicon dioxide layer 18 about the ink inlet channel 22. The diffusion barrier 24 serves to inhibit the diffusion of hydroxyl ions through CMOS oxide layers of the drive circuitry layer 16.

A portion of the diffusion barrier 24 extends from the silicon dioxide layer 18. An ink passivation layer in the form of a layer of silicon nitride 26 is positioned over the aluminum contact layers 20 and the silicon dioxide layer 18, as well as the diffusion barrier 24. Each portion of the layer 26 positioned over the contact layers has an opening 28 defined therein to provide access to the contacts 20.

The nozzle arrangement 10 includes an end wall 30, a pair of side walls 32, a lever structure 34 opposite the end wall 30 and a roof wall 36 positioned on the side walls 32 and the end wall 30. The end wall 30, the side walls 32, the lever structure 34 and the roof wall 36 together define a nozzle chamber 38. The ink inlet channel 22 is in fluid communication with the nozzle chamber 38.

The roof wall 36 defines an ink ejection port 40. The roof wall 36 defines a rim 42 about the ink ejection port 40. A plurality of radially extending recesses 44 is defined in the roof wall 36 about the rim 42. These serve to contain radial ink flow as a result of ink escaping past the nozzle rim 42.

The lever structure 34 has a resiliently flexible carrier 46 having a generally U-shaped profile with a base 48 fast with the layer 26 of silicon nitride and an inner arm 50 and an outer arm 52 extending from the base 48.

The lever structure 34 includes a lever arm 54. The lever arm 54 is pivotally mounted on the side walls 32 with a pair of opposed torsion members 56 that interconnect the lever arm 54 and the side walls 32. A fulcrum member 58 extends centrally from the lever arm 54 and is fast with the outer arm 52 of the carrier 46. A resistance member 60 extends from an inner end of the lever arm 54 and an effort member 62 extends from an outer end of the lever arm 54.

An ink ejection member in the form of a paddle 64 is positioned in the nozzle chamber 38 to span the nozzle chamber 38. The paddle 64 is positioned between the ink inlet channel 22 and the ink ejection port 40. One end of the paddle 64 is fast with the resistance member 60. Thus, tilting of the lever arm 54 results in displacement of the paddle 64. The paddle 64 defines a plurality of corrugations 66 that extend a length of the paddle 64 to impart rigidity to the paddle 64.

A thermal actuator 68 is electrically connected to both the contact layers 20 at the openings 28. The openings 28 are positioned proximate one side 70 of the nozzle arrangement 10. The thermal actuator 68 is of titanium aluminum nitride (TiAN). Further, the thermal actuator 68 has two anchor portions 72 that extend from the silicon nitride layer 26 to a predetermined point spaced from the silicon nitide layer 26. The anchor portions 72 are aligned transversely with respect to the substrate 14.

Each of the anchor portions 72 is positioned at a respective opening 28. Further, each portion 72 is electrically connected to one respective contact layer 20 to define a via 74. Each via 74 includes a titanium layer 76 and the anchor portion 72 sandwiched between a layer 78 of dielectric material in the form of low temperature silicon nitride and one respective contact layer 20.

The thermal actuator 68 includes a pair of actuator arms 80. Each actuator arm 80 extends from a respective anchor portion 72, generally parallel to the substrate 14, towards the lever structure 34. Each actuator arm 80 has an active portion 82 and a passive portion 84. The passive portions 84 are positioned between the active portions 82 and the substrate 14. A bridge member 86 interconnects the active portions 82 at their ends. TiAN is conductive. Thus, the active portions 82 and the bridge member 86 define an electrical heating circuit. TiAN has a coefficient of thermal expansion that can be harnessed to perform work when it undergoes thermal expansion. It follows that when the drive circuitry layer 16 sets up an electrical potential across the contact layers 20, a current flows through the active portions 82 and the bridging member 86. The active portions 82 are thus heated to the substantial exclusion of the passive portions 84. This causes differential expansion of the actuator arms 80 and a bending displacement of the actuator arms 80 towards the substrate 14.

The bridge member 86 is fast with the effort member 62. In particular, the effort member 62 includes a titanium layer 88 that is fast with the bridge member 86. It will therefore be appreciated that as the effort member 62 is driven towards the substrate 14, the resistance member 60 is driven away from the substrate 14 so that the paddle 64 is displaced towards the ink ejection port 40 to eject ink from the ink ejection port 40. When the electrical potential across the contact layers 20 is terminated, the active portions 82 cool down. The actuator arms 80 then undergo differential contraction and the arms 80 are displaced away from the substrate 14. This causes the paddle 64 to pivot back to its starting position.

Figure 2:
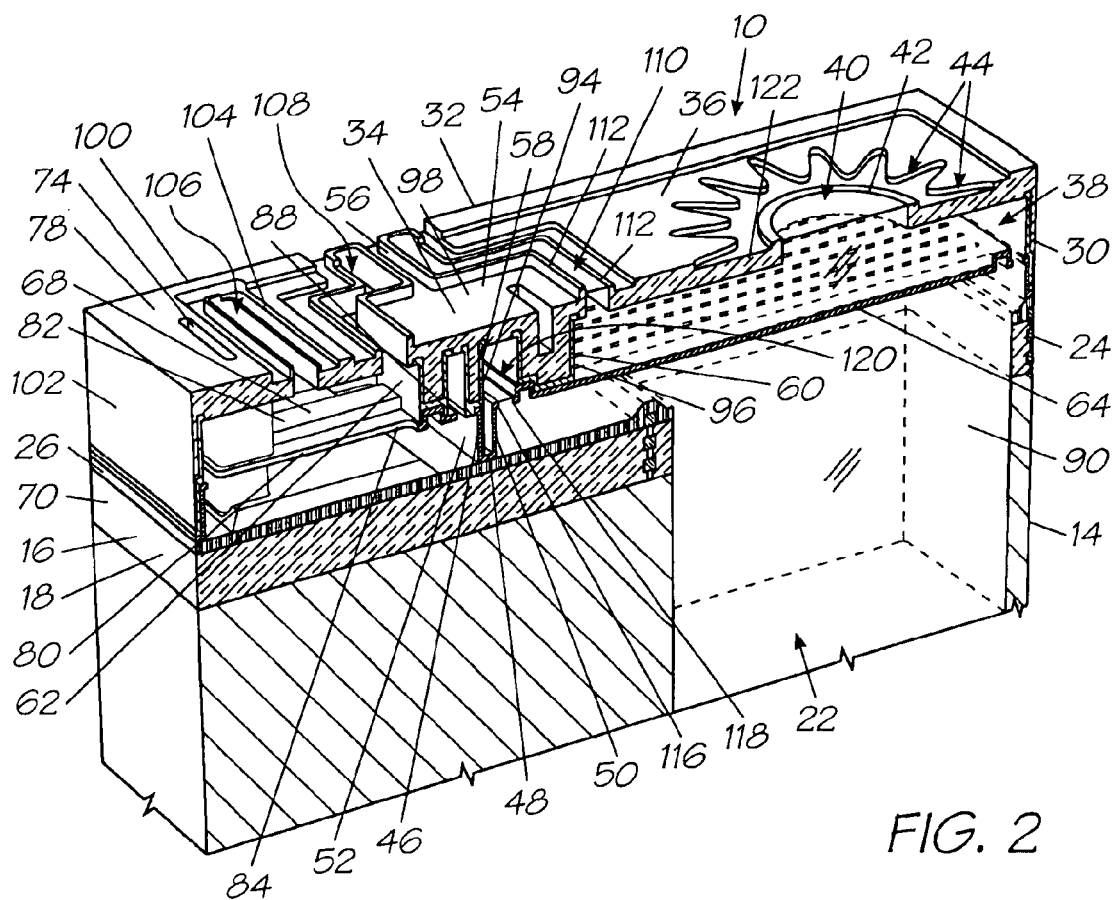
FIG. 2 shows a three-dimensional sectioned view of one nozzle arrangement of the ink jet printhead chip in a pre-ejection quiescent condition.
Figure 3:
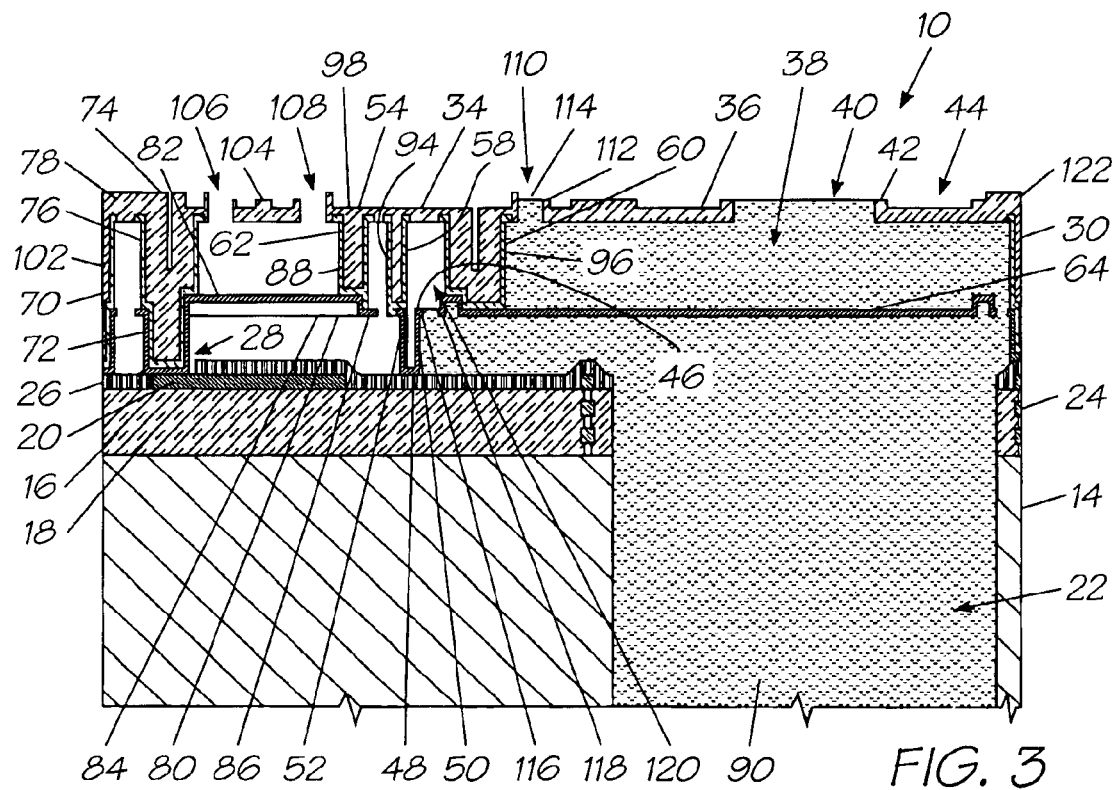
FIG. 3 shows a side sectioned view of the nozzle arrangement of FIG. 2.
Figure 4:
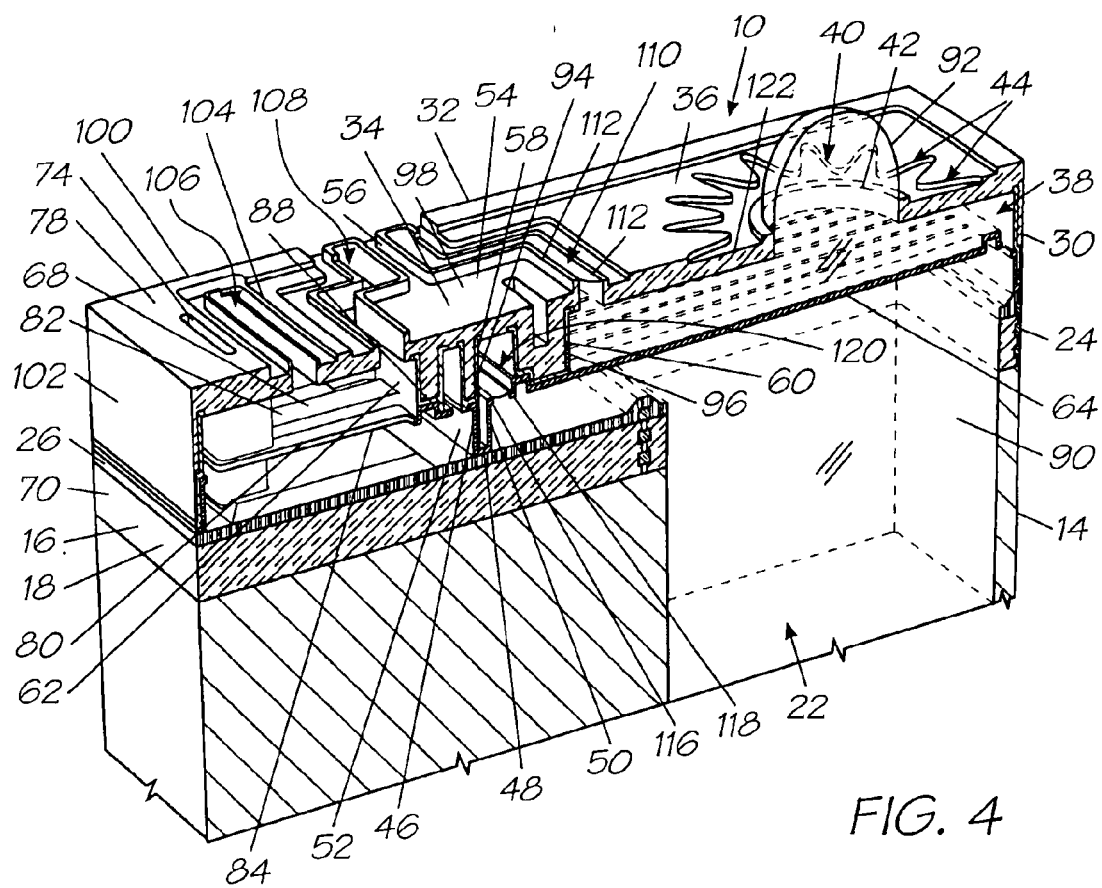
FIG. 4 shows a three-dimensional sectioned view of the nozzle arrangement in an operative condition.
Figure 5:
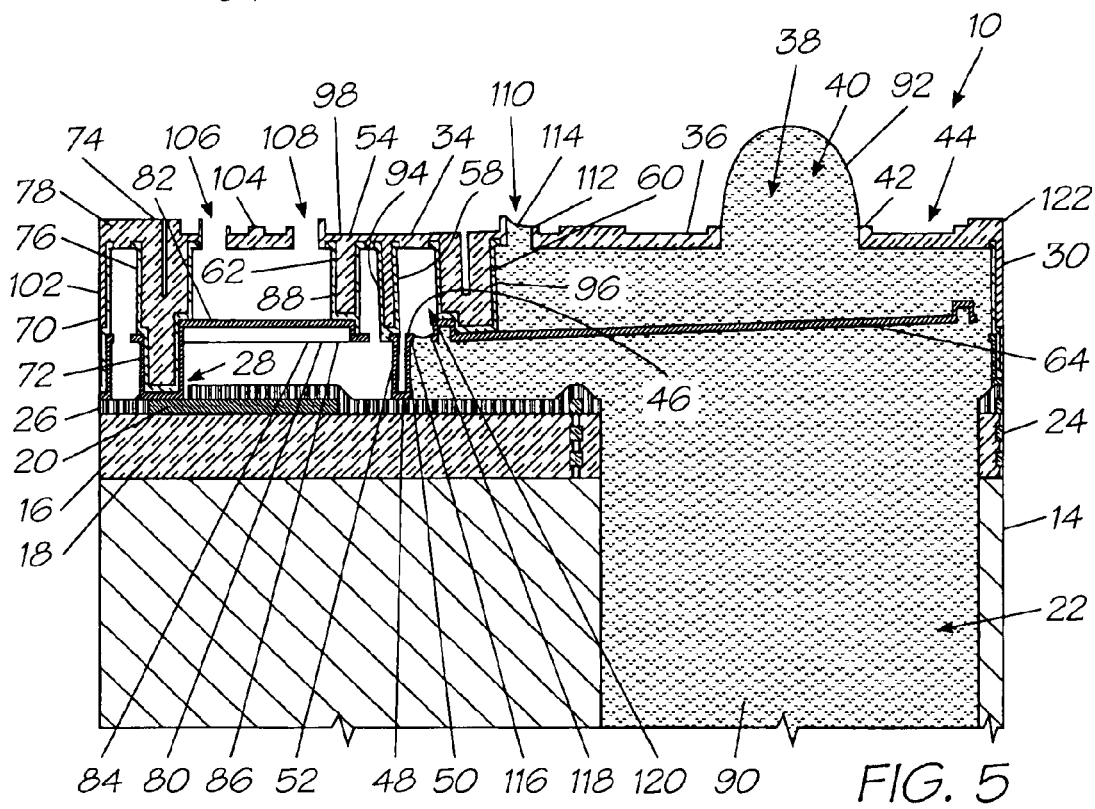
FIG. 5 shows a side sectioned view of the nozzle arrangement of FIG. 4.
Figure 6:
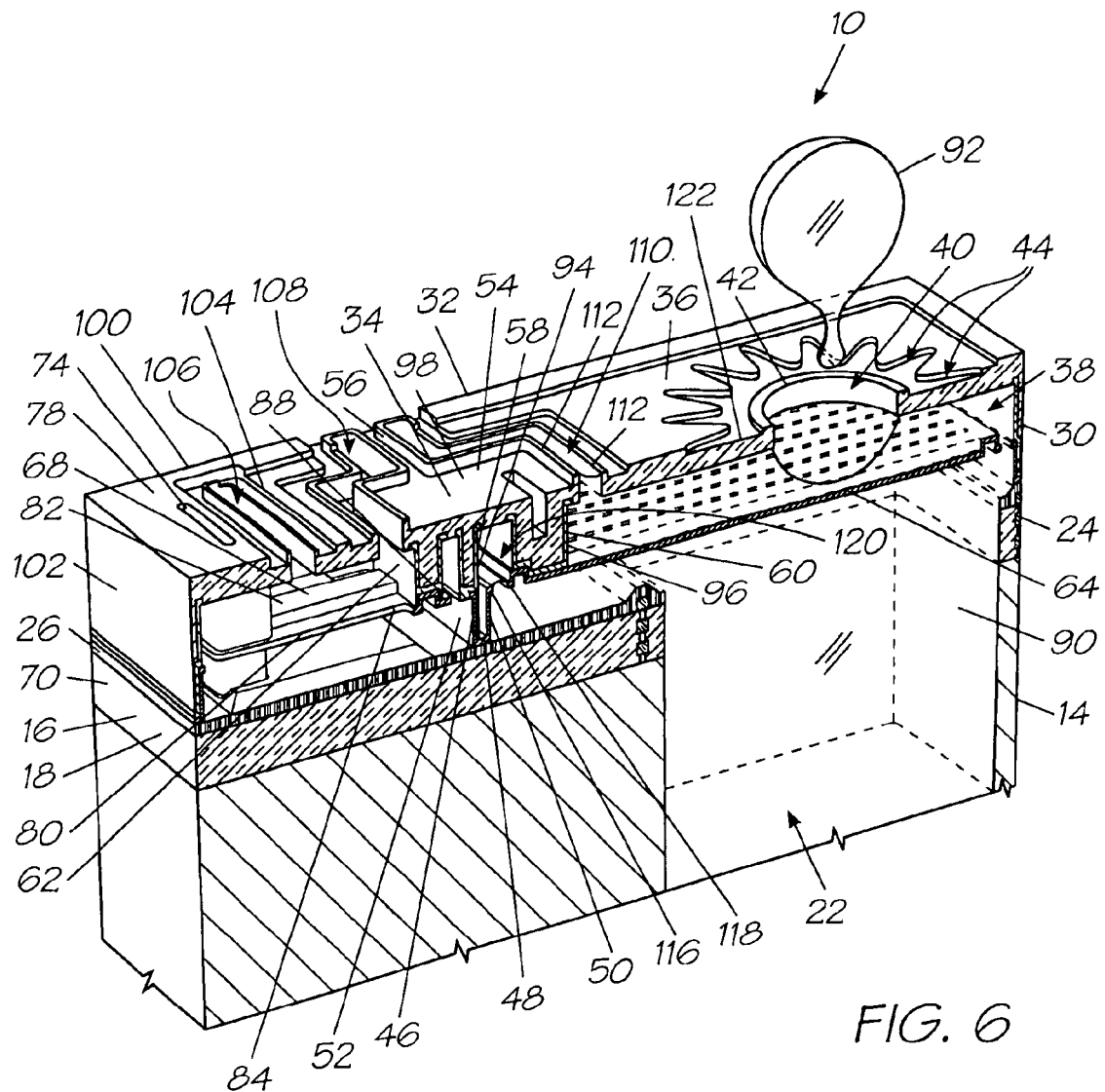
FIG. 6 shows a three-dimensional sectioned view of the nozzle arrangement in a post-ejection quiescent condition.
Figure 7:
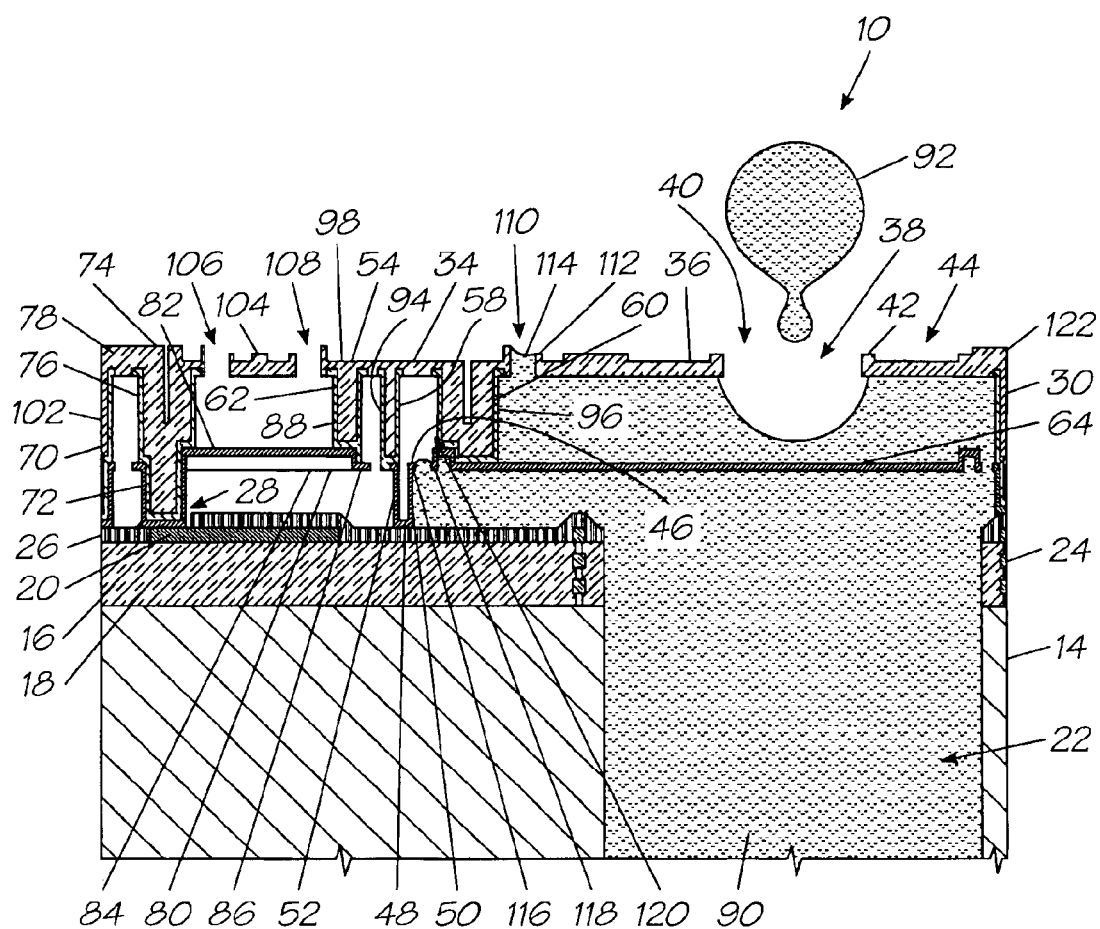
FIG. 7 shows a side sectioned view of the nozzle arrangement of FIG. 6.
Figure 8:
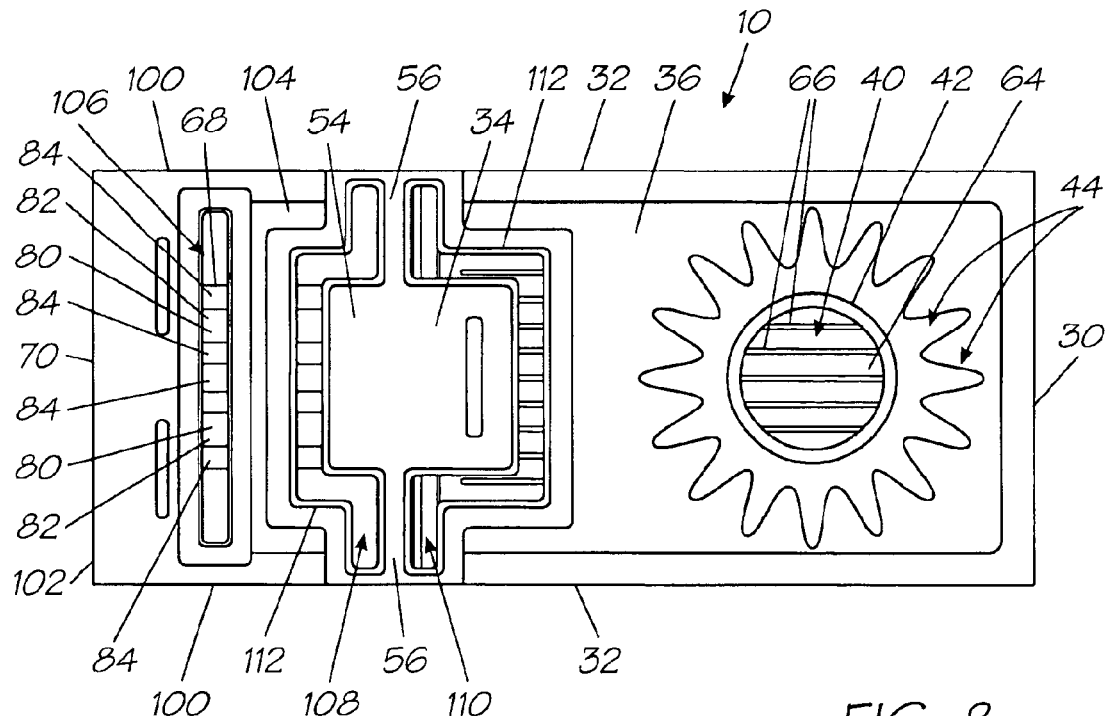
FIG. 8 shows a plan view of the nozzle arrangement.
Figure 9:
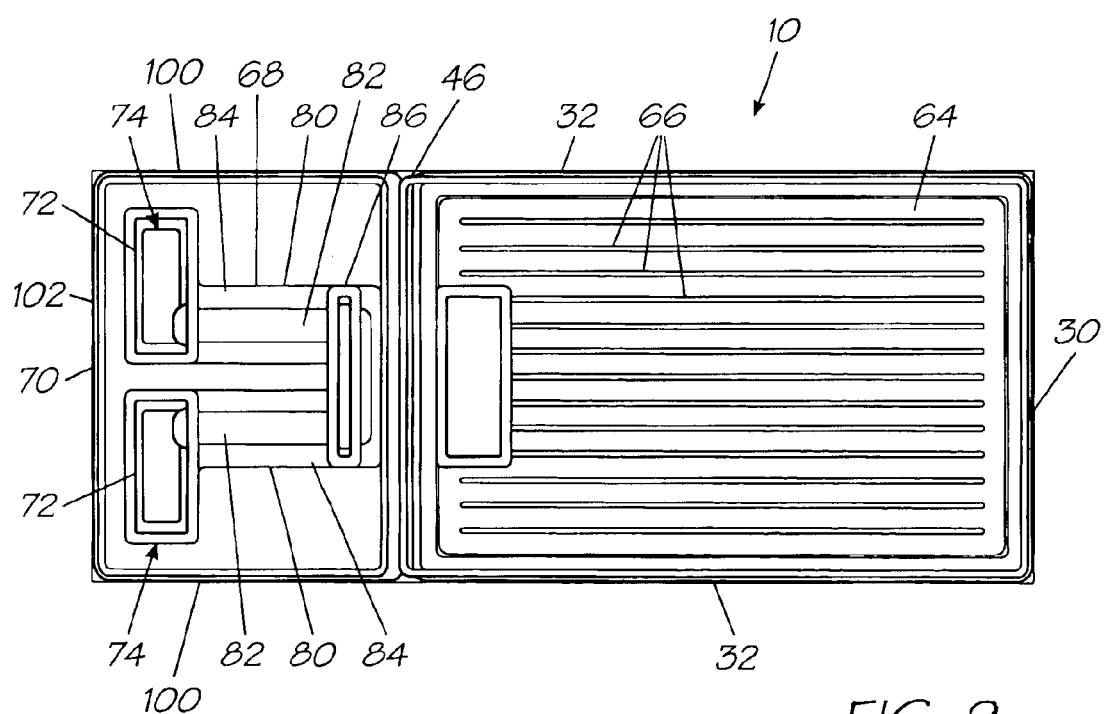
FIG. 9 shows a cut-away plan view of the nozzle arrangement.

As can be seen in FIGS. 2 and 3, the ink inlet channel 22 and the nozzle chamber 38 are filled with ink 90 when the nozzle arrangement 10 is in a pre-ejection quiescent condition. FIGS. 4 and 5 show the effect of setting up a potential across the contact layers 20. A drop 92 of the ink 90 develops outside of the ink ejection port 40 as the paddle 64 is displaced towards the ink ejection port 40. The drop 92 does not separate at this stage. Movement of the paddle 64 back to the starting position results in a negative pressure being set up in the nozzle chamber 38 between the paddle 64 and the ink ejection port 40. This causes the ink 90 to suck back into the nozzle chamber 38 resulting in the necessary necking and separation of the drop 92 from a remainder of the ink 90 in the nozzle chamber 38, as shown in FIGS. 6 and 7. It will be appreciated that the actuator arms 80 are required to be capable of a high rate of expansion and contraction in order to achieve a high page per minute (ppm) printing characteristic. Applicant has found through substantial experimentation and investigation that TiAN is a suitable material for such an application.

A layer 94 of titanium is fast with the outer arm 52 of the base 48 to form part of the fulcrum member 58. A layer 96 of titanium is fast with the paddle 64 to form part of the resistance member 60. A layer 98 of dielectric material such as low temperature silicon nitride is positioned on the layers 88, 94 and 96 of titanium to define the lever arm 54 and the remainders of the fulcrum member 58, the effort member 62 and the resistance member 60. The layer 98 also defines the torsion members 56.

The layer 78 defining part of each via 74 also defines further opposed side walls 100, a further end wall 102 and a cover 104. The side walls 100, the end wall 102, the cover 104 and the lever structure 34 together define an air chamber in which the actuator arms 80 are positioned. The cover 104 defines a slotted opening 106. The cover 104 and the lever arm 54 define a gap 108 to permit movement of the lever arm 54. The lever arm 54 and the roof wall 36 also define a gap 110 for the same reason.

Ridges 112 bound the gaps 108, 110. A distance between the ridges 112 of the gap 110 is such that the ridges 112 define a fluidity seal. Thus, when the nozzle chamber 38 is filled with the ink 90, a meniscus 114 formed between the ridges 112 is strong enough to accommodate movement of the lever arm 54 relative to the roof wall 36 and changes in ink pressure without breaking. In particular, the meniscus 114 is able to move along surfaces defined by the ridges 112 as the lever arm 54 is displaced relative to the roof wall 36.

An air space 120 is defined between the resistance member 60 and the fulcrum member 58 to facilitate movement of the lever arm 54. A lip 116 is positioned on an end of the inner arm 50 of the base 48. The paddle 64 has a re-entrant portion 118 where the paddle 64 is fast with the titanium layer 96. The re-entrant portion 118 and the lip 116 have a profile that is shaped to define a fluidity seal. Thus, the ink 90 is inhibited from entering the space 120 during operation of the nozzle arrangement 10.

As can be seen in the drawings, the roof wall 36, the lever arm 54 and the cover 104 are all defined by a common layer 122. Those skilled in the art will appreciate that microelectromechanical devices are extremely sensitive to physical contact. In this case, the actuator arms 80 would be susceptible to handling damage without the cover 104. The cover 104 also serves to inhibit detritus, such as paper dust and dried ink, from damaging or interfering with the operation of the actuator arms 80.

The printhead chip 12 incorporates a plurality of nozzle arrangements 10 as shown in FIG. 1. It follows that, by connecting the nozzle arrangements 10 to suitable micro processing circuitry and a suitable control system, printing can be achieved. A detail of the manner in which the nozzle arrangements 10 are connected to such components is described in the above referenced patents/patent applications and is therefore not set out in any detail in this specification. It is to be noted, however, that the ink jet printhead chip 12 is suitable for connection to any micro processing apparatus that is capable of controlling, in a desired manner, a plurality of nozzle arrangements. In particular, since the nozzle arrangements 10 span the print medium, the nozzle arrangements 10 can be controlled in a digital manner. For example, a 1 can be assigned to an active nozzle arrangement 10 while a 0 can be assigned to a quiescent nozzle arrangement 10, in a dynamic manner.

In the following paragraphs, the manner of fabrication of the nozzle arrangement 10 is described, by way of example only. It will be appreciated that the following description is for purposes of enablement only and is not intended to limit the broad scope of the preceding summary or the invention as defined in the appended claims.

Figure 10:
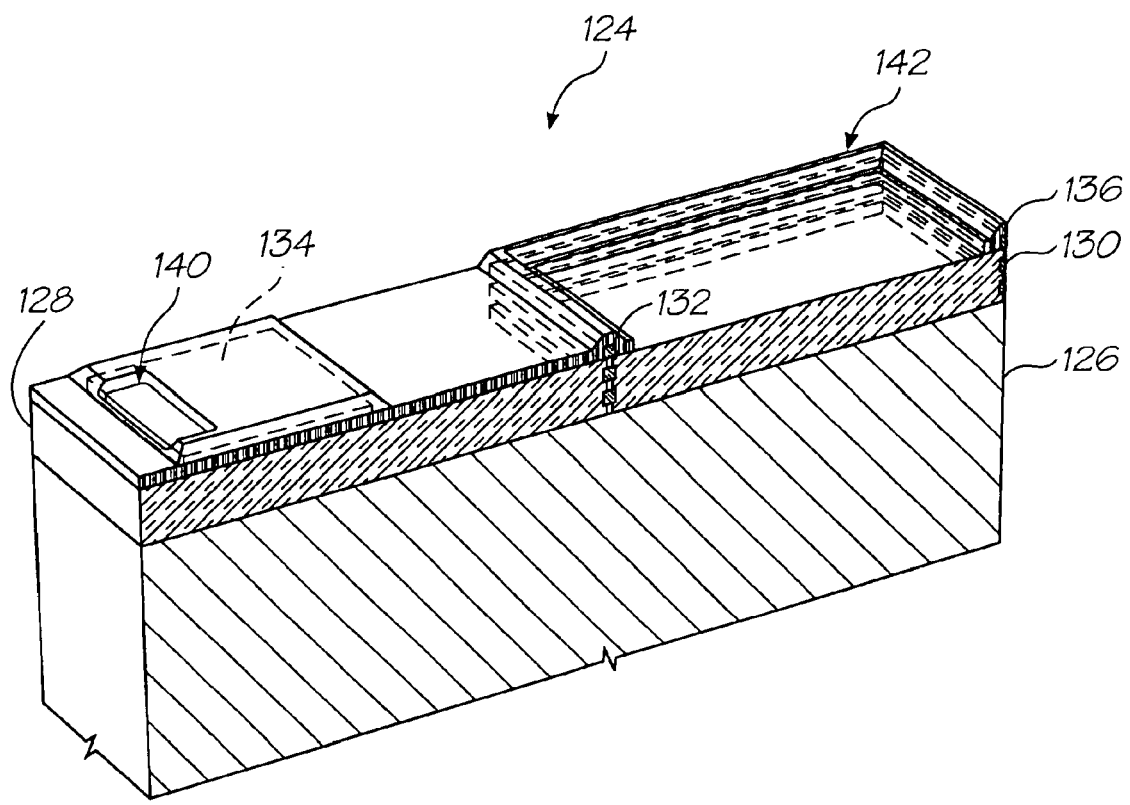
FIG. 10 shows a three-dimensional sectioned view through A—A in FIG. 12 of a wafer substrate, a drive circuitry layer, contact layers and an ink passivation layer for a starting stage in the fabrication of each nozzle arrangement of the printhead chip.
Figure 11:
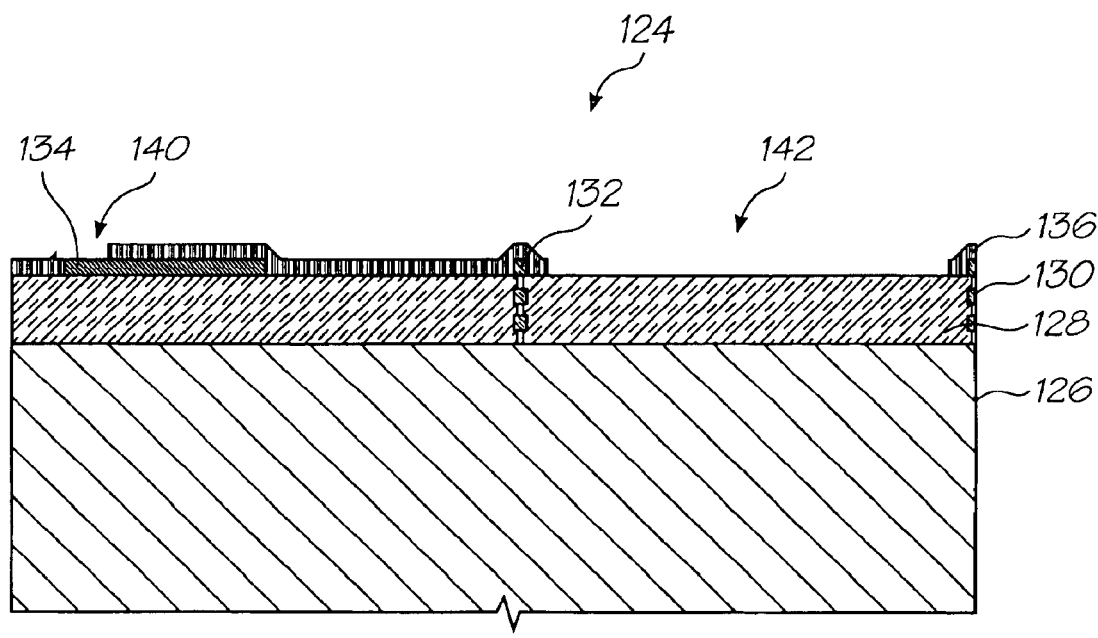
FIG. 11 shows a sectioned view through B—B in FIG. 12 of the stage of FIG. 10.

In FIGS. 10 and 11, reference numeral 124 generally indicates a complete 0.35 micron 1P4M 12 Volt CMOS wafer that is the starting stage for the fabrication of the nozzle arrangement 10. It is again emphasized that the following description of the fabrication of a single nozzle arrangement 10 is simply for the purposes of convenience. It will be appreciated that the processing techniques and the masks used are configured to carry out the fabrication process, as described below, on a plurality of such nozzle arrangements. However, for the purposes of convenience and ease of description, the fabrication of a single nozzle arrangement 10 is described. Thus, by simply extrapolating the following description, a description of the fabrication process for the ink jet printhead chip 12 can be obtained.

The CMOS wafer 124 includes a silicon wafer substrate 126. A layer 128 of silicon dioxide is positioned on the wafer substrate 126 to form CMOS dielectric layers. Successive portions of CMOS metal 1, CMOS metal 2/3 and CMOS top level metal define an aluminum diffusion barrier 130. The barrier 130 is positioned in the layer 128 of silicon dioxide with a portion 132 of the barrier 130 extending from the layer 128. The diffusion barrier 130 serves to inhibit hydroxyl ions from diffusing through the CMOS oxide layers of the layer 128. The CMOS top level metal defines a pair of aluminum electrode contacts 134 positioned on the layer 128.

A layer 136 of CMOS passivation material in the form of silicon nitride is positioned over the layer 128 of silicon dioxide, the portion 132 of the diffusion barrier 130 and the contacts 134. The silicon nitride layer 136 is deposited and subsequently patterned with a mask 138 in FIG. 12. The silicon nitride layer 136 is the result of the deposition of a resist on the silicon nitride, imaging with the mask 138 and subsequent etching to define a pair of contact openings 140, aligned across the wafer 124 and an opening 142 for an ink inlet channel to be formed.

The silicon dioxide layer 128 has a thickness of approximately 5 microns. The layer 136 of silicon nitride has a thickness of approximately 1 micron.

Figure 12:
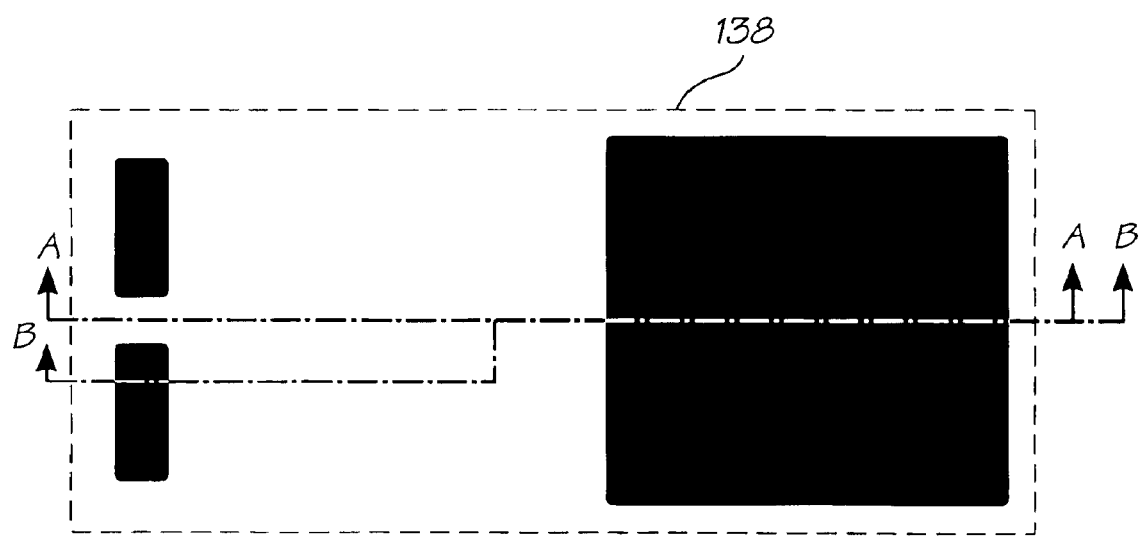
FIG. 12 shows a mask used for patterning the ink passivation (silicon nitride) layer.
Figure 13:
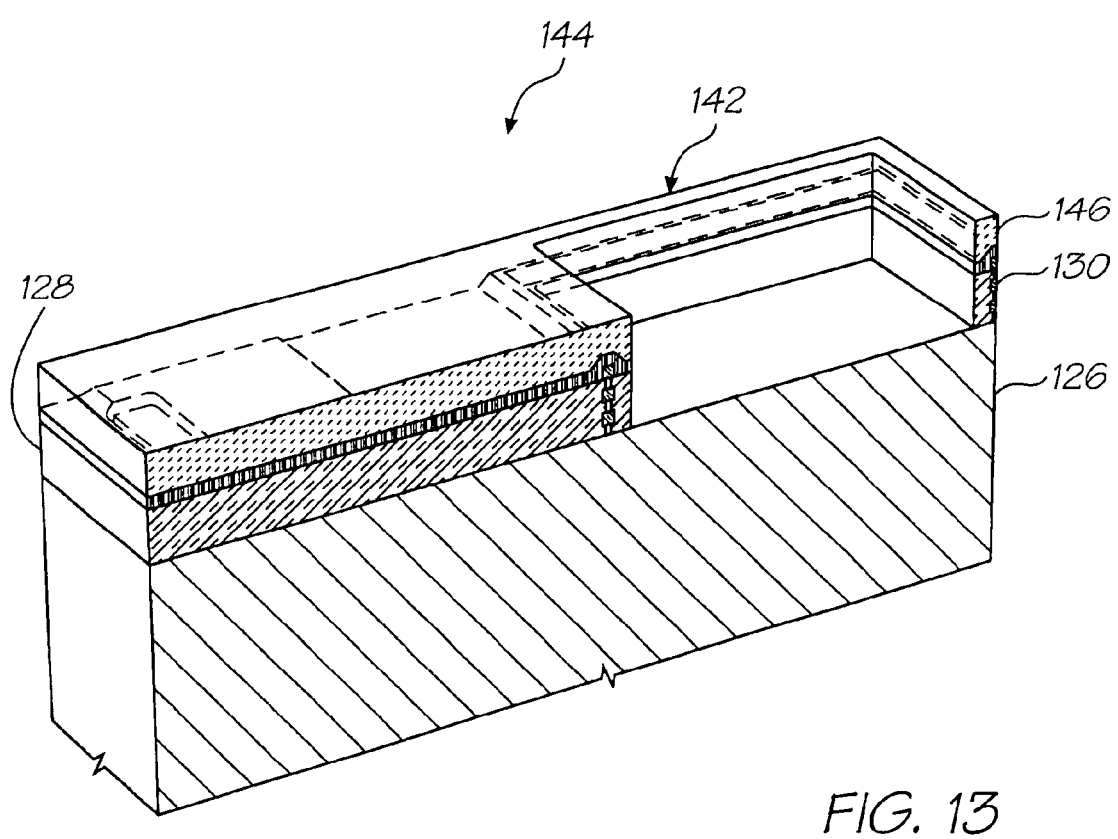
FIG. 13 shows a three-dimensional view through A—A in FIG. 15 of the stage of FIG. 10 with a resist layer deposited and patterned on the ink passivation layer.
Figure 14:
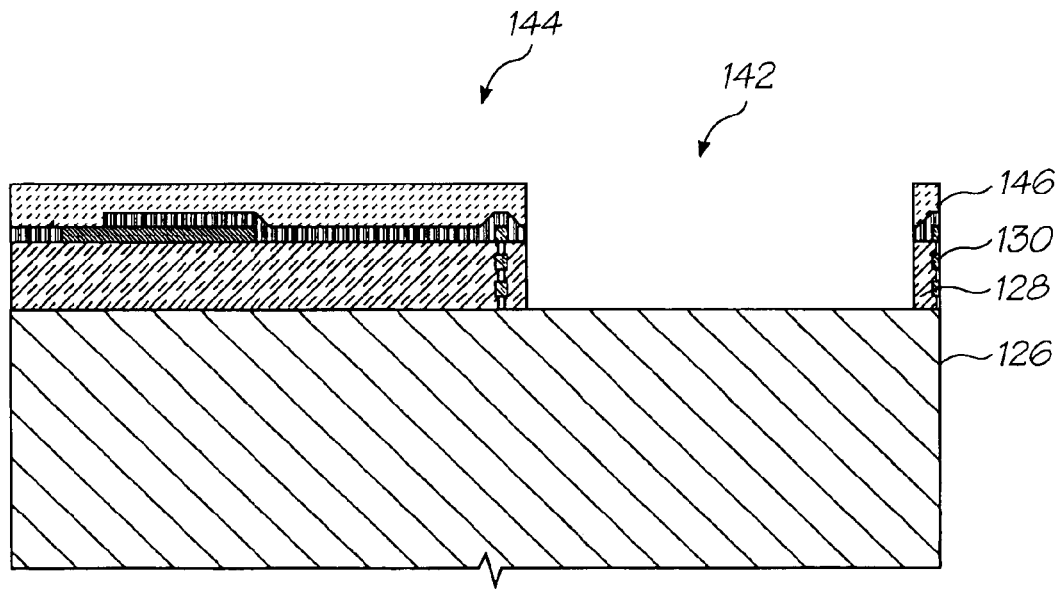
FIG. 14 shows a side sectioned view through B—B in FIG. 15 of the stage of FIG. 13.

In FIGS. 13 and 14, reference numeral 144 generally indicates a further fabrication step on the CMOS wafer 124. With reference to FIGS. 10 to 12, like reference numerals refer to like parts, unless otherwise specified.

The structure 144 shows the etching of the CMOS dielectric layers defined by the layer 128 of silicon dioxide down to bare silicon of the wafer 124.

Figure 15:
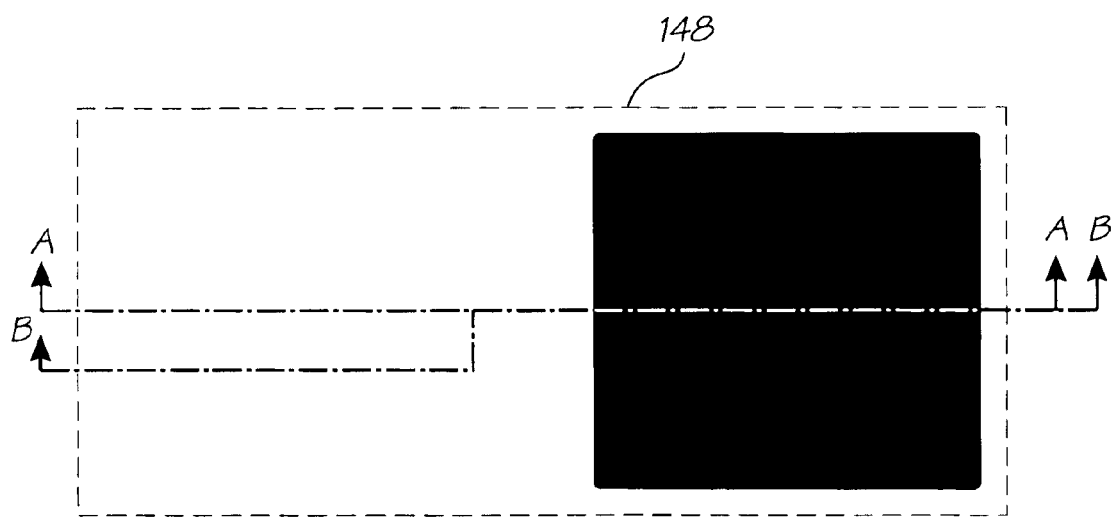
FIG. 15 shows a mask used for patterning the resist layer of FIG. 13.

Approximately 3 microns of resist material 146 is spun onto the silicon nitride layer 136. The resist material 146 is a positive resist material. A mask 148 in FIG. 15 is used for a photolithographic step carried out on the resist material 146. The photolithographic image that is indicated by the mask 148 is then developed and a soft bake process is carried out on the resist material 146.

The photolithographic step is carried out as a 1.0 micron or better stepping process with an alignment of +/−0.25 micron. An etch of approximately 4 microns is carried out on the silicon dioxide layer 128 down to the bare silicon of the silicon wafer substrate 126.

Figure 16:
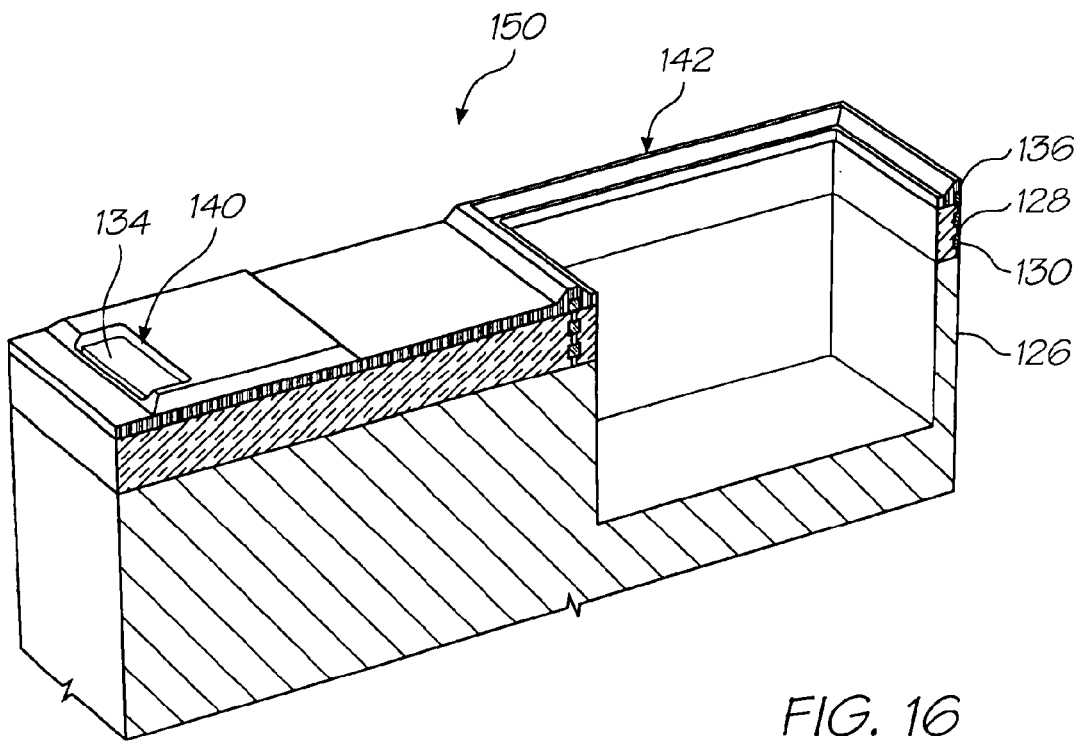
FIG. 16 shows a side sectioned view of the stage of FIG. 13, with the resist layer removed and the wafer substrate etched to a predetermined depth to define an ink inlet channel of the nozzle arrangement.
Figure 17:
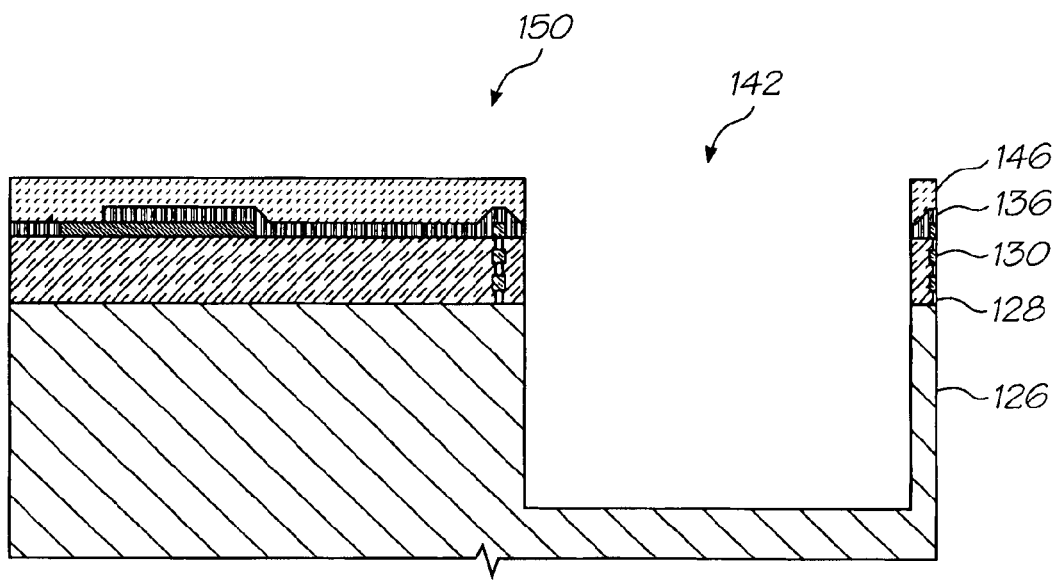
FIG. 17 shows the stage of FIG. 16 prior to the removal of the resist layer.

In FIGS. 16 and 17, reference numeral 150 generally indicates the structure 144 after a deep reactive ion etch (DRIE) is carried out on the silicon wafer substrate 126.

The etch is carried out on the bare silicon of the substrate 126 to develop the ink inlet channel 22 further. This is a DRIE to 20 microns (+10/−2 microns). Further in this step, the resist material 146 is stripped and the structure is cleaned with an oxygen plasma cleaning process.

The etch depth is not a critical issue in this stage. Further, the deep reactive ion etch can be in the form of a DRAM trench etch.

Figure 18:
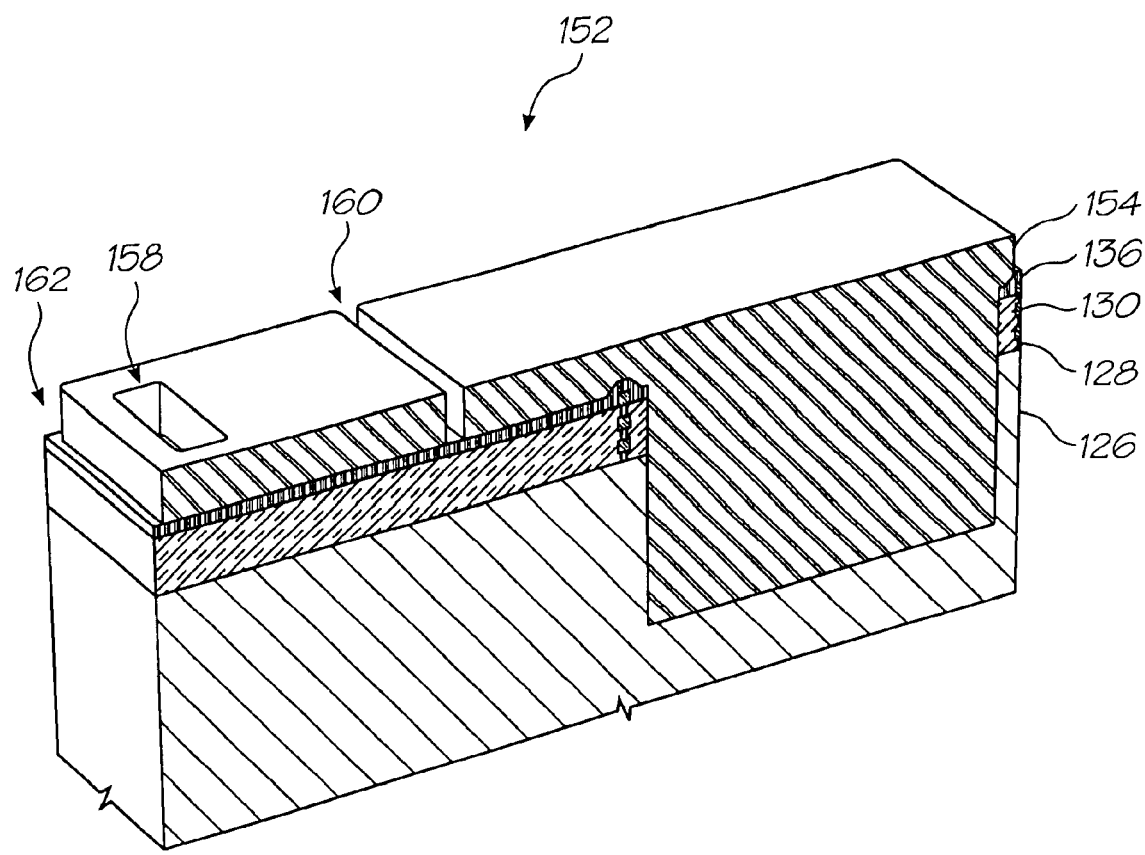
FIG. 18 shows a three-dimensional sectioned view through A—A in FIG. 20 of the stage of FIG. 16 with a first sacrificial layer deposited and patterned on the ink passivation layer.
Figure 19:
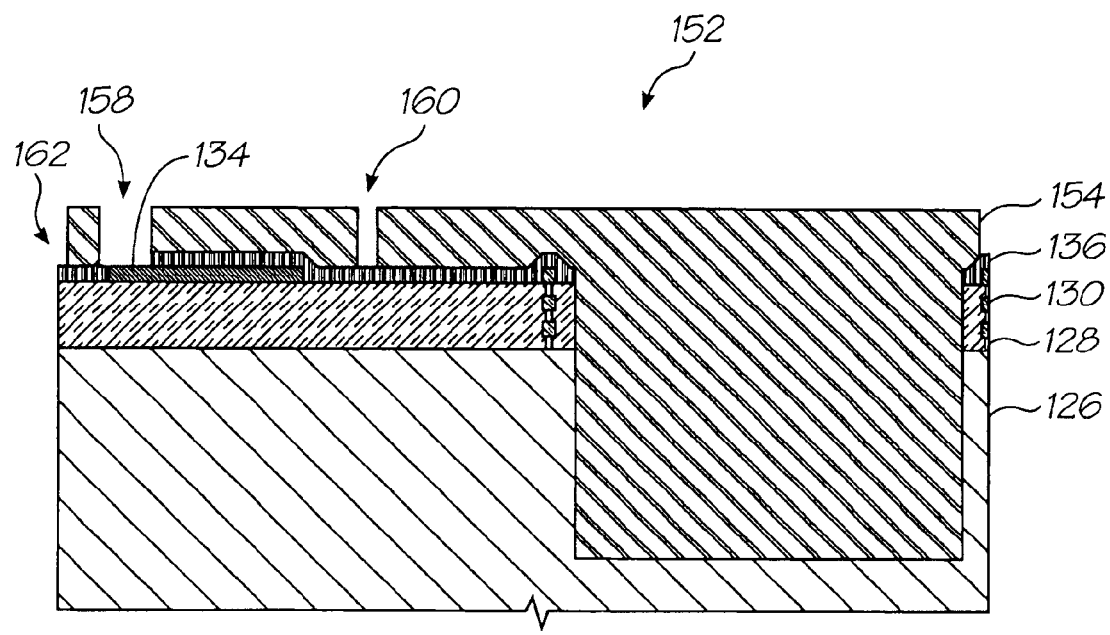
FIG. 19 shows a side sectioned view through B—B in FIG. 20 of the stage of FIG. 18.

In FIGS. 18 and 19, reference numeral 152 generally indicates the structure 150 with a first layer 154 of sacrificial resist material positioned thereon. With reference to the preceding FIGS. 10 to 17, like reference numerals refer to like parts, unless otherwise specified.

Figure 20:
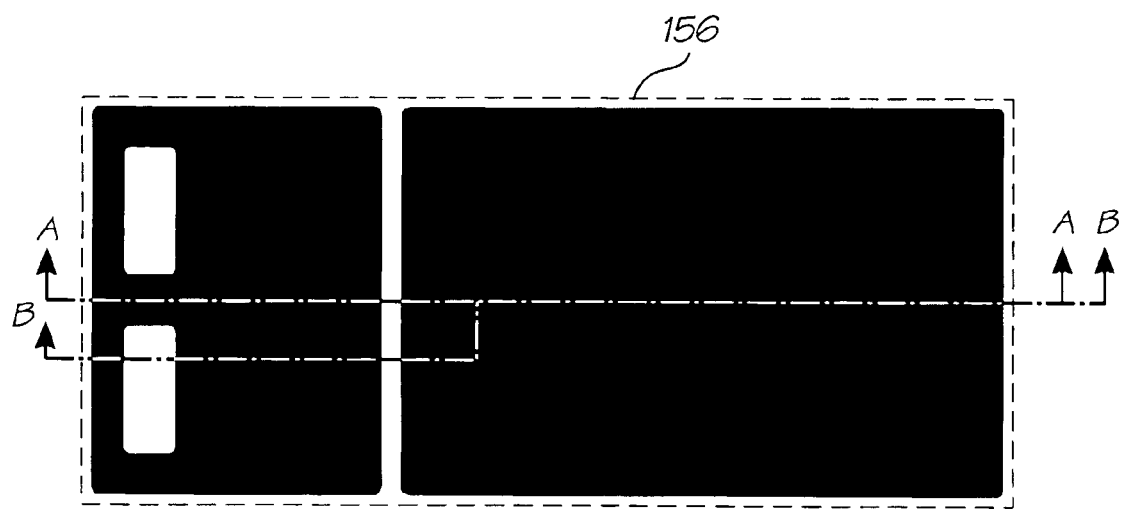
FIG. 20 shows a mask used for patterning the first sacrificial layer.

In this stage, approximately 3.5 microns of the sacrificial resist material is spun on to the front surface of the structure 150. A mask 156 in FIG. 20 is used together with a photolithographic process to pattern the first layer 154 of the sacrificial material.

The photolithographic process is a 1.0 micron stepping process or better. The mask bias is +0.3 micron and the alignment is ±0.25 micron.

The sacrificial material 154 is a positive resist material. The sacrificial material 154 can be in the form of a polyimide.

Being a positive resist, the first layer 154, when developed, defines a pair of contact openings 158 which provide access to the aluminum electrode contact layers 134. The first layer 154 also defines a deposition zone 160 for the carrier 46. Still further, the first layer 154 defines a deposition zone 162 for the end walls 30, 102 and the side walls 32, 100.

As can be seen in the drawings, a region that was previously etched into the silicon wafer substrate 126 and through the silicon dioxide layer 128 to initiate the ink inlet channel 22 is filled with the sacrificial material 154.

The sacrificial material 154 is cured with deep ultraviolet radiation. This serves to stabilize the sacrificial material 154 to increase the resistance of the sacrificial material 154 to later etching processes. The sacrificial material 154 shrinks to a thickness of approximately 3 microns.

Figure 21:
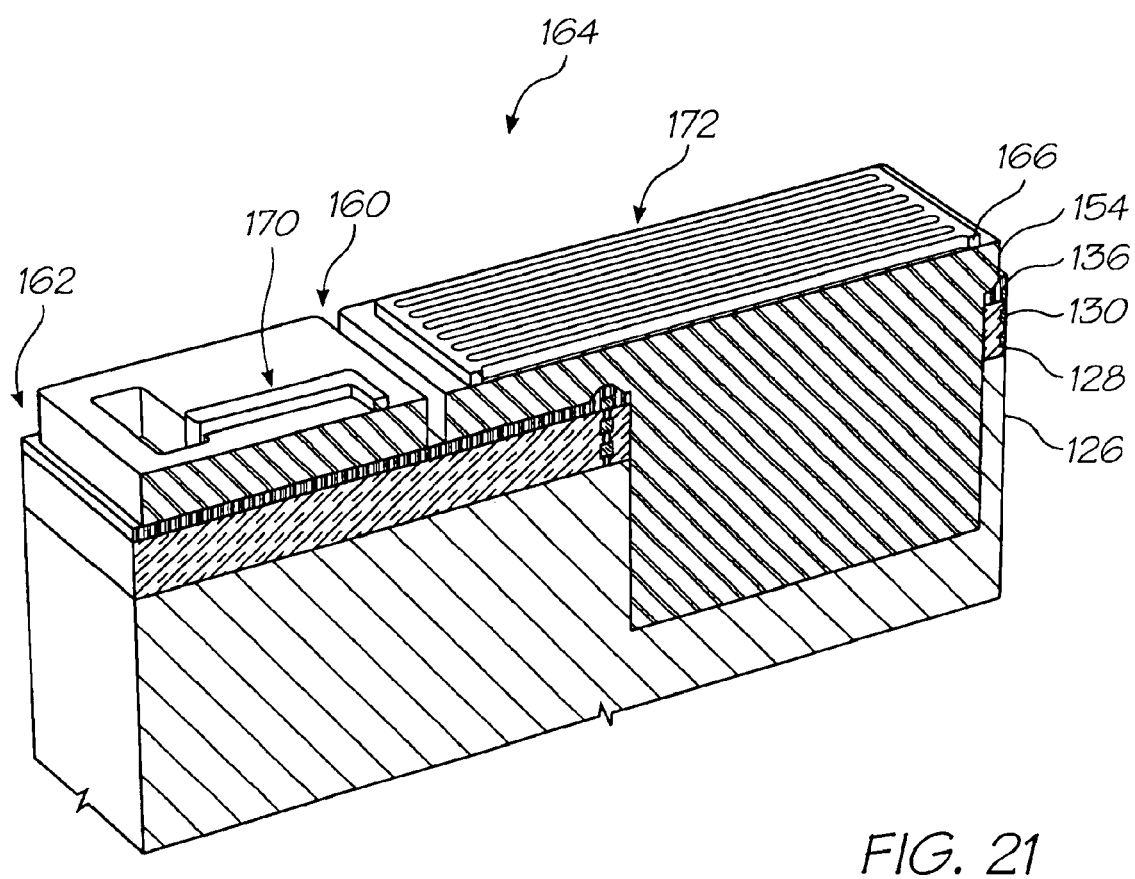
FIG. 21 shows a three-dimensional sectioned view through A—A in FIG. 23 of the stage of FIG. 18 with a second sacrificial layer deposited and patterned on the first sacrificial layer.
Figure 22:
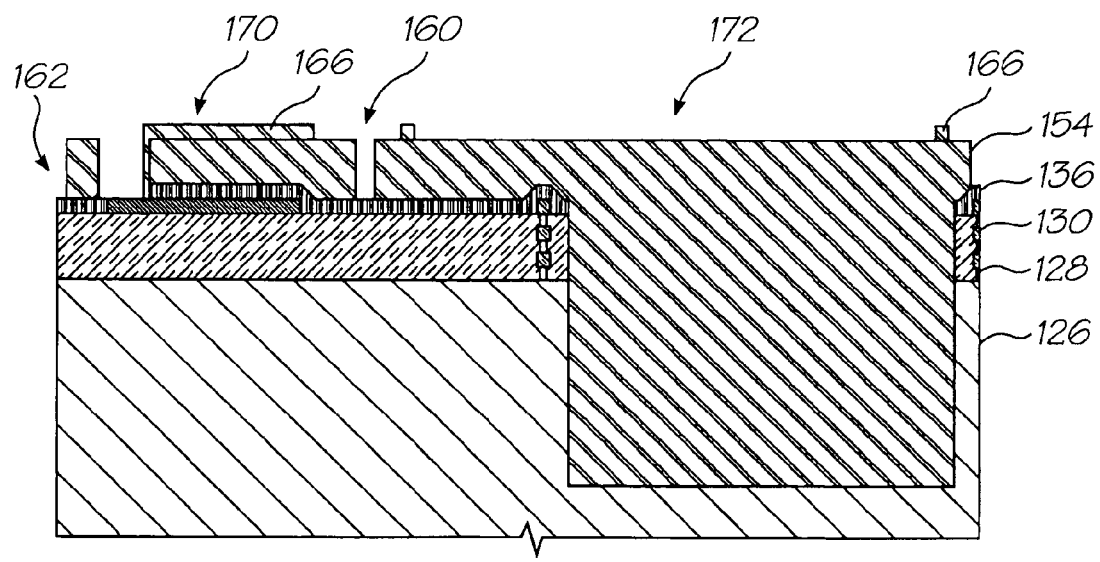
FIG. 22 shows a side sectioned view through B—B in FIG. 23 of the stage of FIG. 21.

In FIGS. 21 and 22, reference numeral 164 generally indicates the structure 152 with a second layer 166 of sacrificial resist material developed thereon. With reference to FIGS. 10 to 20, like reference numerals refer to like parts, unless otherwise specified.

In this stage, approximately 1.2 microns of the sacrificial resist material 166 in the form of a positive resist material are spun onto the structure 152. The sacrificial material 166 can be in the form of a polyimide.

Figure 23:
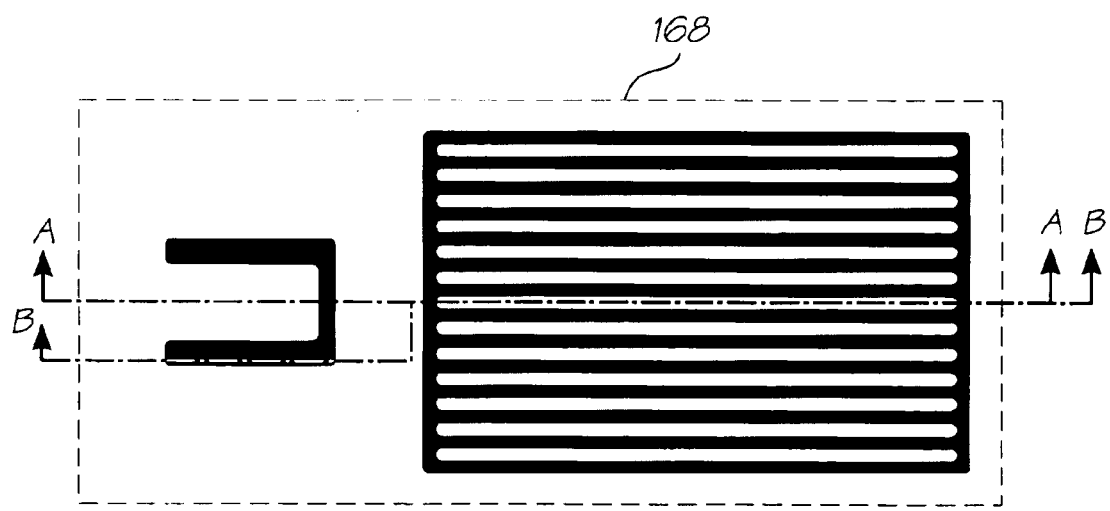
FIG. 23 shows a mask used for patterning the second sacrificial layer.

A mask 168 shown in FIG. 23 is used together with a photolithographic process to pattern the sacrificial material 166. The photolithographic process is a 1.0 micron stepper or better process. Further, the mask bias is +/0.2 micron for top features only. The alignment during the photolithographic process is +/−0.25 micron.

Subsequent development of the sacrificial material 166 results in the structure shown in FIGS. 21 and 22. The openings 158 are extended as a result of the mask 168. Further, deposition zones 170 are provided for the active portions 82 of the actuator arms 80 and the bridge member 86. It will also be apparent that a deposition zone 172 is formed for the paddle 64.

Once developed, the sacrificial material 166 is cured with deep ultraviolet radiation. This causes the sacrificial material 166 to shrink to 1 micron.

Figure 24:
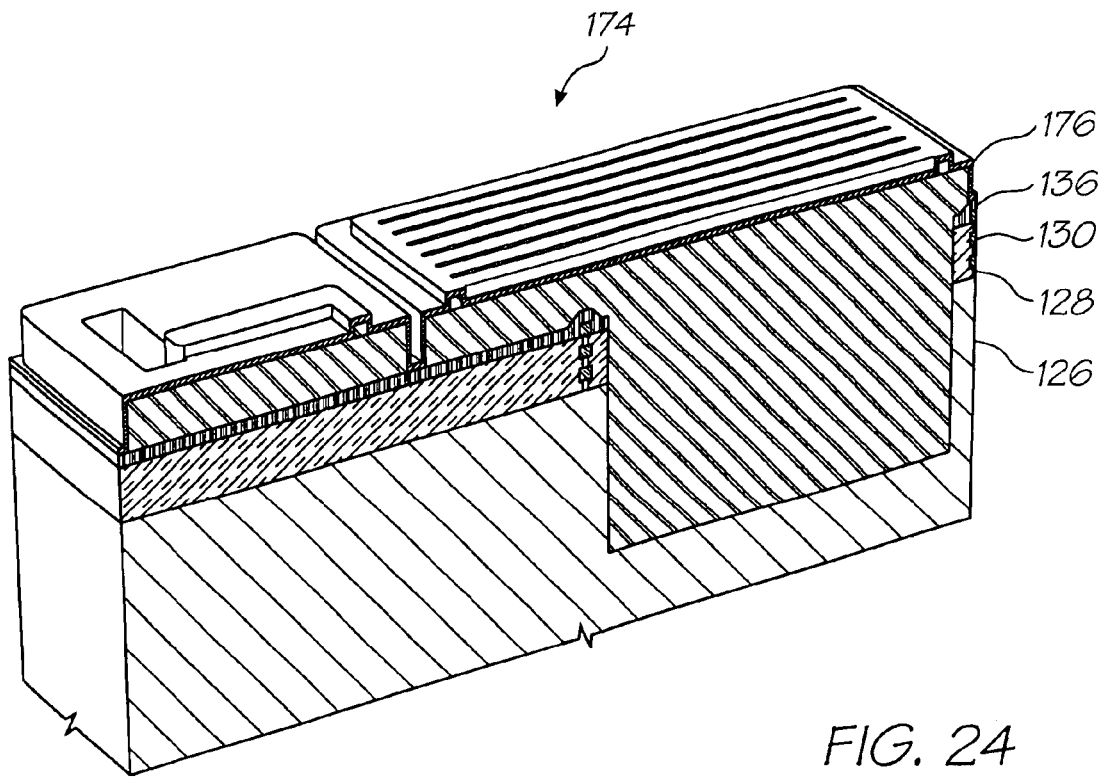
FIG. 24 shows a three-dimensional view through A—A in FIG. 28 of the stage of FIG. 21 with a layer of conductive material deposited on the second sacrificial layer.
Figure 25:
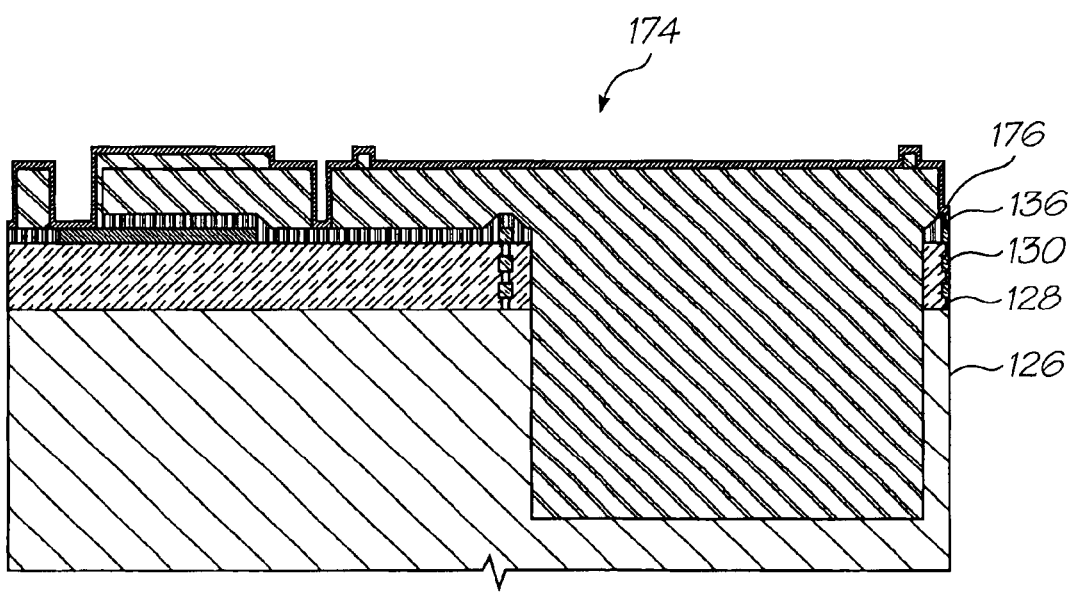
FIG. 25 shows a side sectioned view through B—B in FIG. 28 of the stage of FIG. 24.

In FIGS. 24 and 25, reference numeral 174 generally indicates the structure 164 with a layer 176 of TiAN deposited on the structure 164. With reference to FIGS. 10 to 23, like reference numerals refer to like parts, unless otherwise specified.

In this stage, initially, approximately 50 Angstroms of titanium aluminum alloy at approximately 200 degrees Celsius are sputtered onto the structure 164 in an argon atmosphere. Thereafter, a nitrogen gas supply is provided and 5000 Angstroms of titanium aluminum is sputtered with the result that titanium aluminum nitride is deposited on the initial titanium aluminum metallic layer.

The initial titanium aluminum metallic layer is essential to inhibit the formation of non-conductive aluminum nitride at the resulting aluminum/titanium aluminum nitride interface.

The titanium aluminum is sputtered from a $Ti_{0.8} Al_{0.2}$ alloy target in a nitrogen atmosphere.

Titanium nitride can also be used for this step, although titanium aluminum nitride is the preferred material.

Possible new CMOS copper barrier materials such as titanium aluminum silicon nitride have potential due to their amorphous nanocomposite nature.

The deposition thickness can vary by up to 5 per cent.

Figure 26:
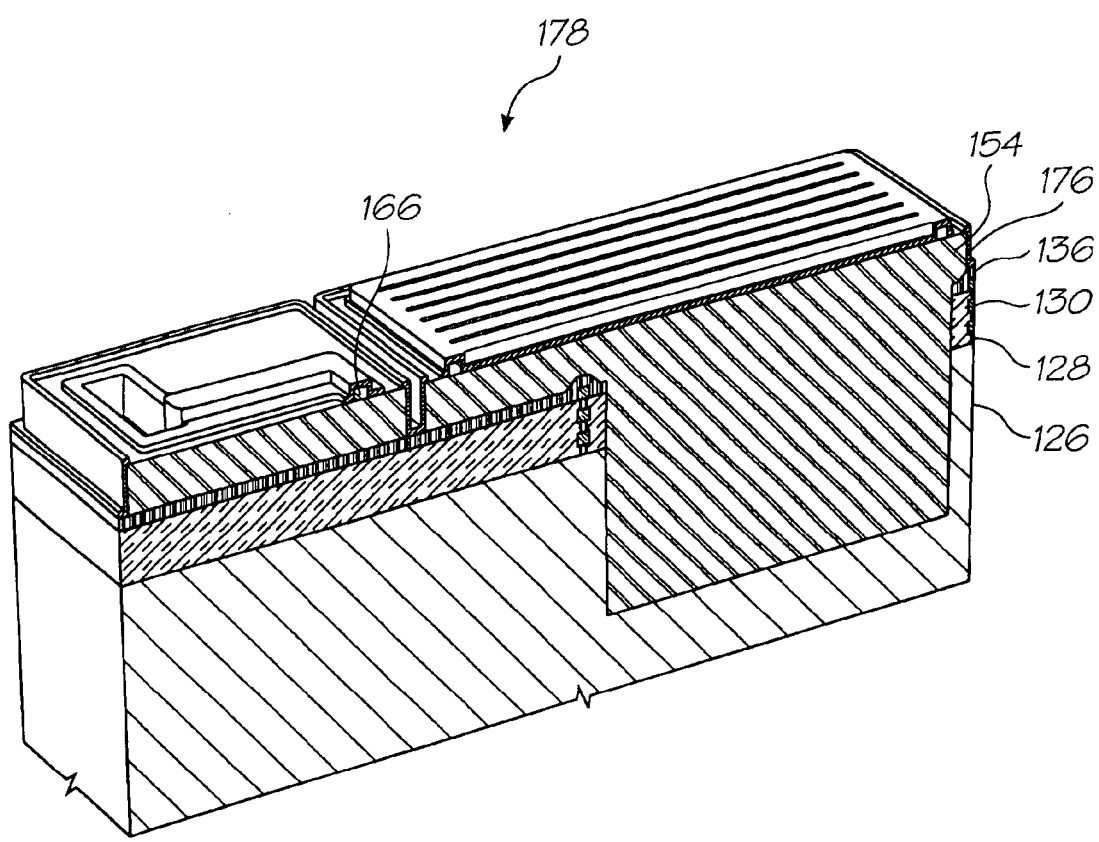
FIG. 26 shows a sectioned three-dimensional view through A—A in FIG. 28 of the stage of FIG. 24 with the conductive layer subjected to a selective etch.
Figure 27:
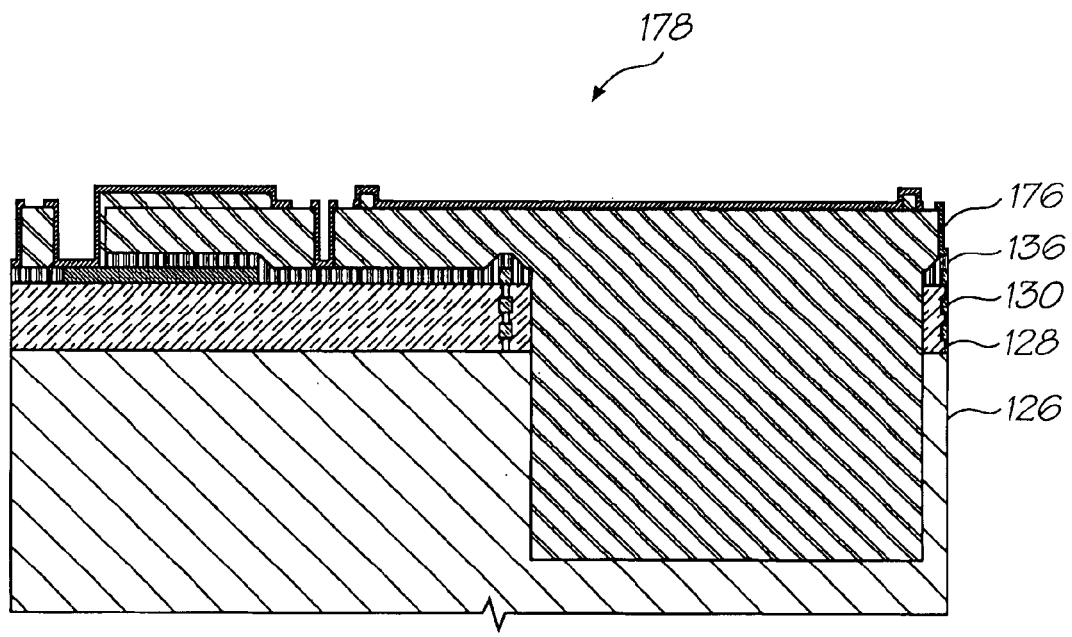
FIG. 27 shows a side sectioned view through B—B in FIG. 28 of the stage of FIG. 26.

In FIGS. 26 and 27, reference numeral 178 generally indicates the structure 172 with the TiAN layer 176 etched down to the preceding layers 154, 166. With reference to FIGS. 10 to 25, like reference numerals refer to like parts, unless otherwise specified.

At this stage, approximately 1 micron of a positive resist material is spun onto the layer 176.

Figure 28:
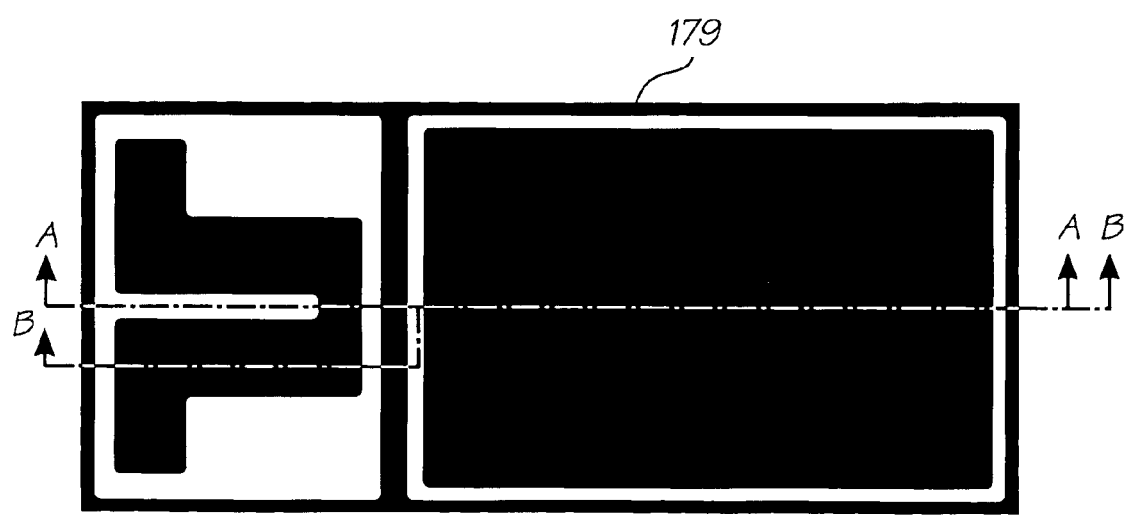
FIG. 28 shows a mask used for the etching of the conductive layer.

A mask 179 in FIG. 28 is used together with a photolithographic process to image the positive resist material. The resist material is then developed and undergoes a soft bake process.

The photolithographic process is a 0.5 micron or better stepper process. The mask bias is +0.2 micron for the top features only. The alignment of the mask 180 is +/−0.25 micron.

The TiAN layer 176 is etched to a depth of approximately 1.5 micron. A wet stripping process is then used to remove the resist. This ensures that the sacrificial material is not removed. A brief clean with oxygen plasma can also be carried out. This can remove sacrificial material so should be limited to 0.2 micron or less.

The result of this process is shown in FIGS. 26 and 27. As can be seen, this process forms the anchor portions 72 and the actuator arms 80 together with the bridge member 86 of the thermal actuator 68. Further, this process forms the carrier 46 and the paddle 64. Still further, this process forms the end walls 30, 102 and the side walls 32, 100.

Figure 29:
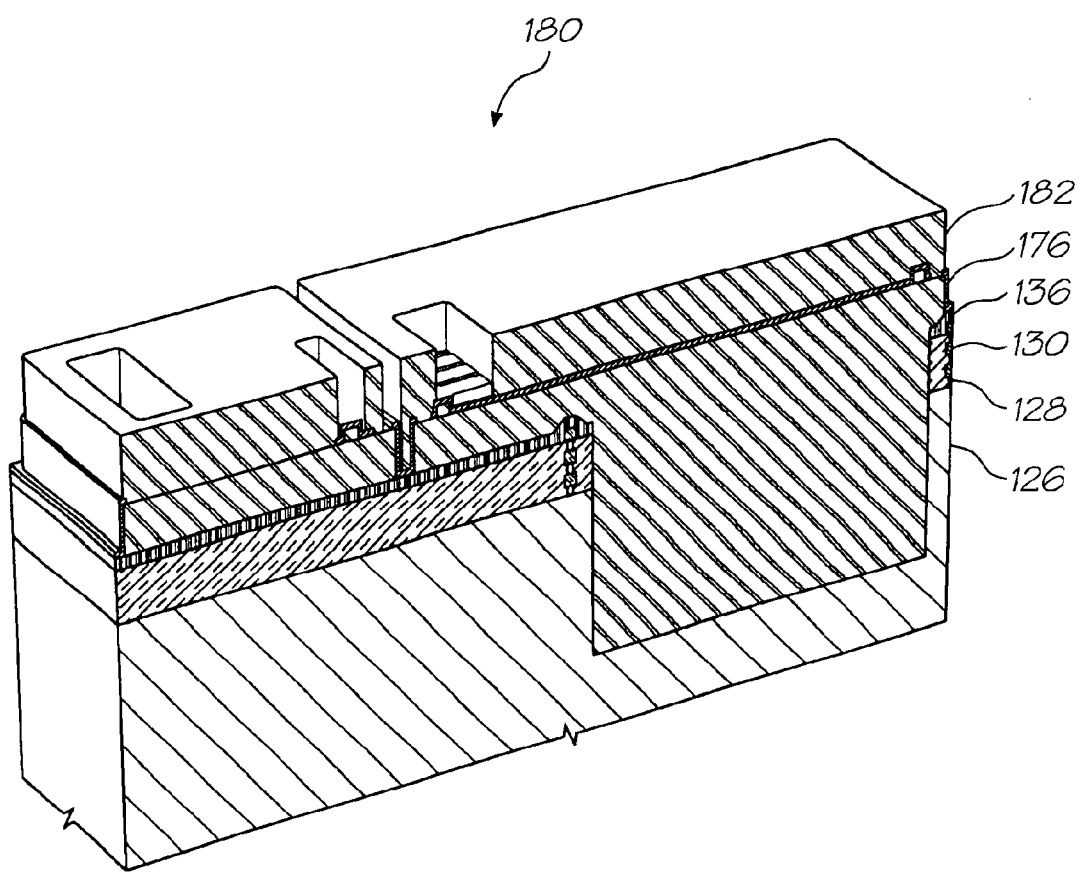
FIG. 29 shows a three-dimensional sectioned view through A—A in FIG. 31 with a third layer of sacrificial material deposited on the etched conductive layer.
Figure 30:
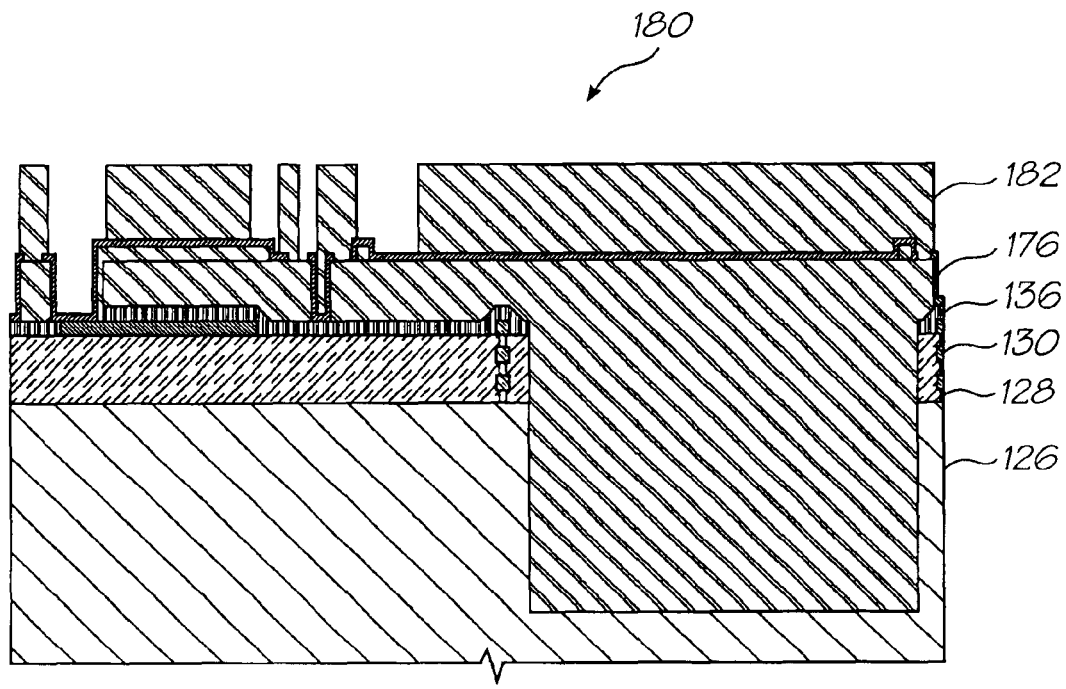
FIG. 30 shows a sectioned side view through B—B in FIG. 31 of the stage of FIG. 29.

In FIGS. 29 and 30, reference numeral 180 generally indicates the structure 178 with a third layer 182 of sacrificial resist material positioned thereon. With reference to FIGS. 10 to 28, like reference numerals refer to like parts, unless otherwise specified.

At this stage, approximately 3.5 microns of the sacrificial material 182 are spun onto the structure 178. The sacrificial material 182 is a positive resist material. The sacrificial material 182 can be in the form of a polyimide.

Figure 31:
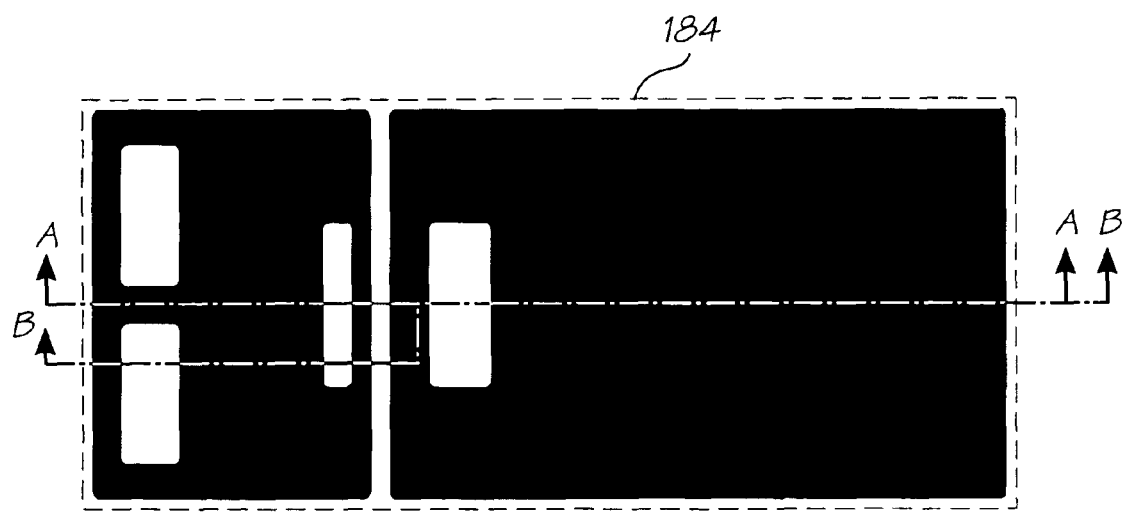
FIG. 31 shows a mask used for the deposition of the third layer of sacrificial material.

A mask 184 in FIG. 31 is used to carry out a photolithographic imaging process on the sacrificial material 182.

The photolithographic process is a 1.0 micron stepper or better process. Further, the mask bias is +/−0.2 micron for the top features only. The alignment of the mask 164 is +/−0.25 micron.

Subsequent development of the sacrificial material 182 results in the structure 180 shown in FIG. 28 and FIG. 29.

During this step, the layers 154, 166 and 182 of sacrificial material are hard baked at 250 degrees Celsius for six hours in a controlled atmosphere. The sacrificial material 182 shrinks to 3.0 microns.

Figure 32:
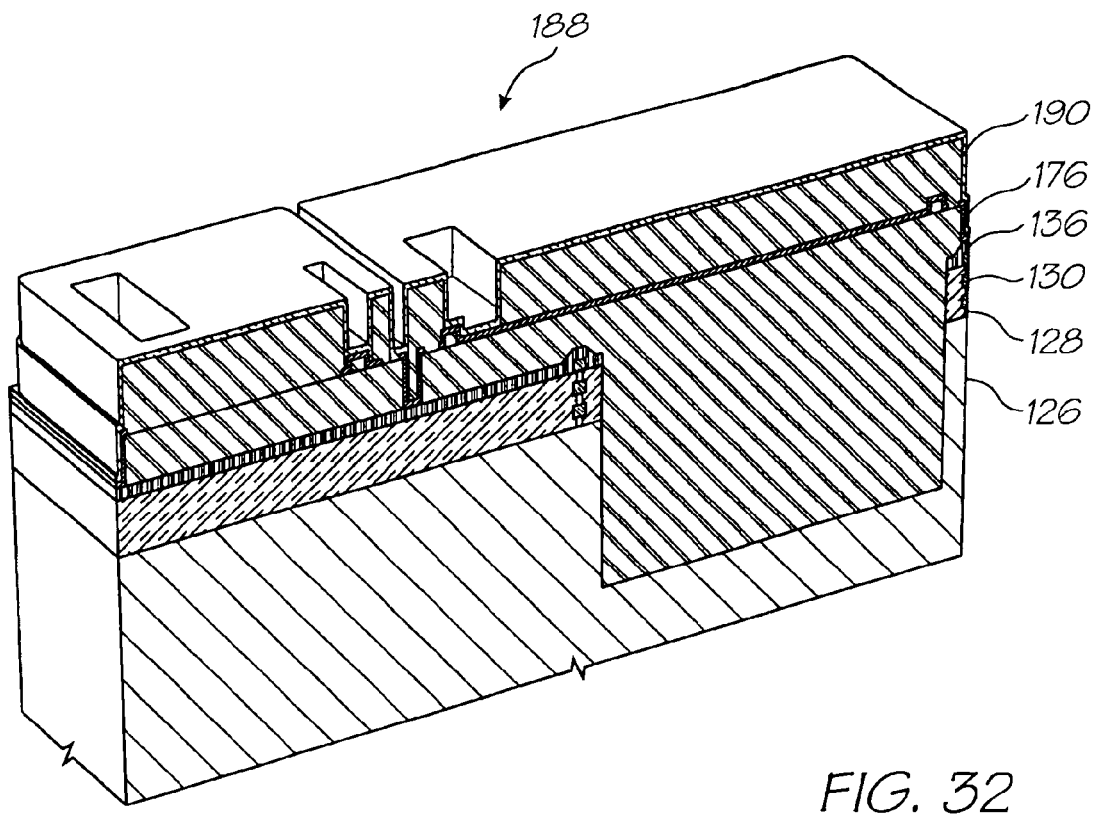
FIG. 32 shows a sectioned three-dimensional view through A—A in FIG. 31 of the stage of FIG. 29 with a layer of titanium deposited on the third layer of sacrificial material.
Figure 33:
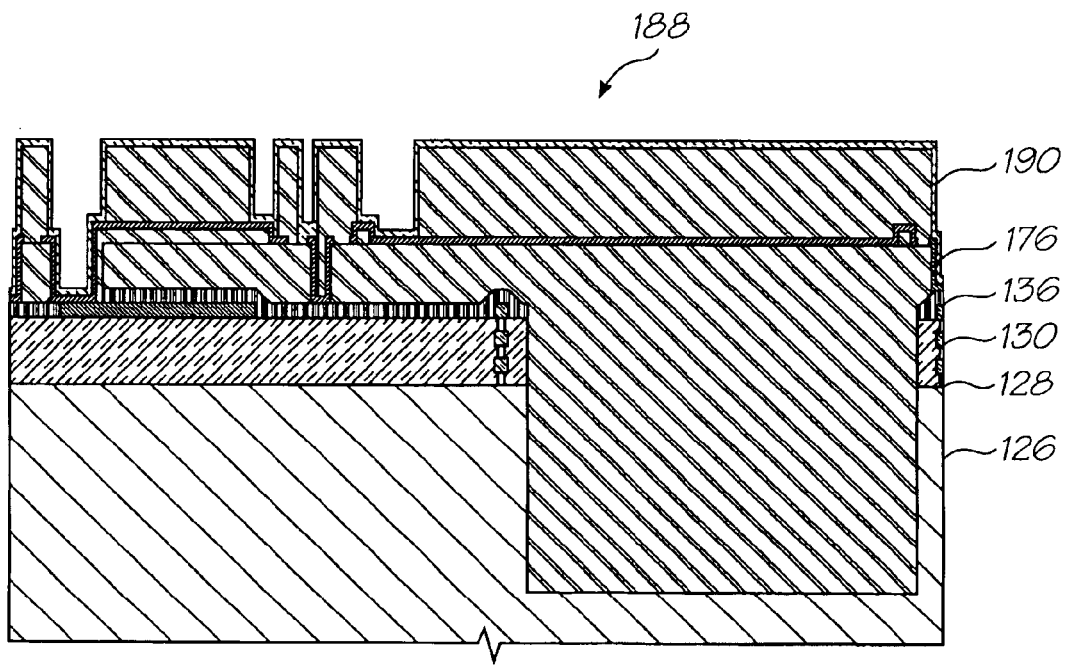
FIG. 33 shows a side sectioned view of the stage of FIG. 32.

In FIGS. 32 and 33, reference numeral 188 generally indicates the structure 180 with a layer 190 of titanium deposited thereon. With reference to FIGS. 10 to 31, like reference numerals refer to like parts, unless otherwise specified.

At this stage, approximately 0.5 micron of titanium is sputtered on to the structure 180 at approximately 200 degrees Celsius in an argon atmosphere.

It is important to note that the mechanical properties of the layer 190 are not important. Instead of titanium, the material can be almost any inert malleable metal that is preferably highly conductive. Platinum or gold can be used in conjunction with a lift-off process. However, the use of gold will prevent subsequent steps being performed in the CMOS fabrication. Ruthenium should not be used as it oxidizes in subsequent oxygen plasma etch processes which are used for the removal of sacrificial materials.

The deposition thickness can vary by 30% from 0.5 micron and remain adequate. A deposition thickness of 0.25 micron should be achieved in any holes.

Figure 34:
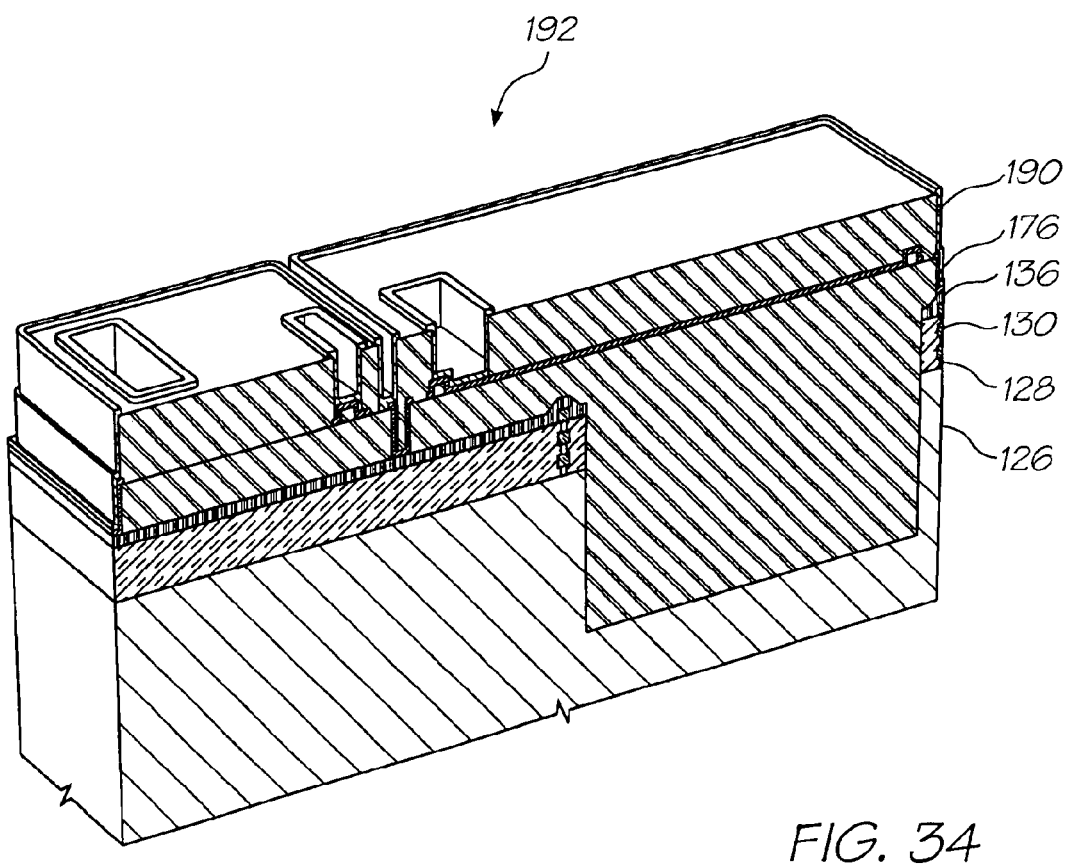
FIG. 34 shows a three-dimensional sectioned view taken through A—A in FIG. 36 of the layer of titanium subjected to an etch.
Figure 35:
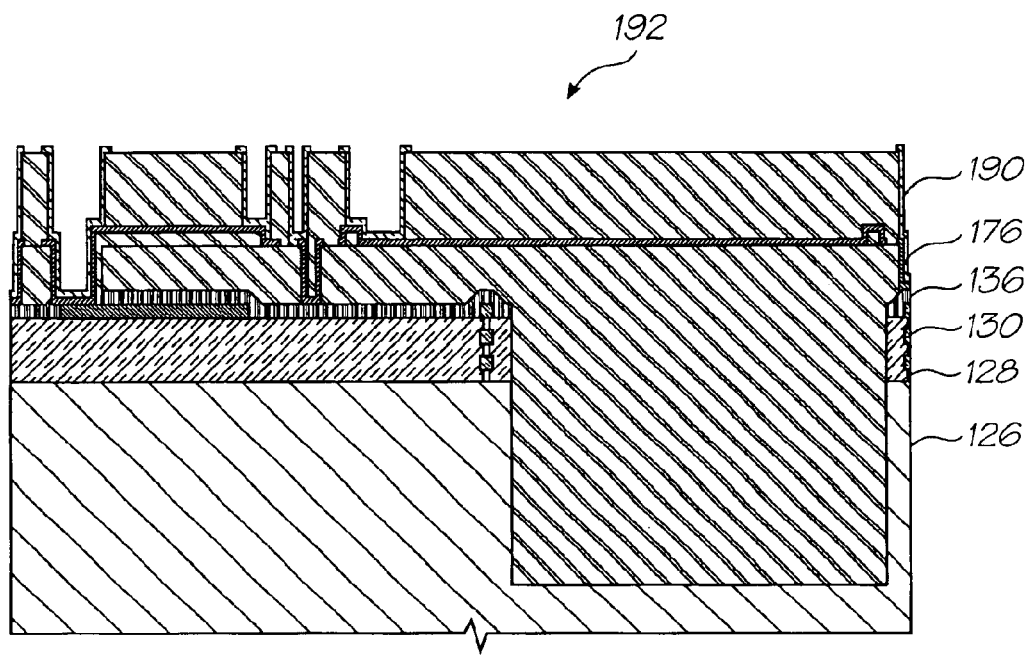
FIG. 35 shows a side sectioned view through B—B in FIG. 36 of the stage of FIG. 34.

In FIGS. 34 and 35, reference numeral 192 generally indicates the structure 188 with the layer 190 of titanium etched down to the sacrificial layer 182.

Figure 36:
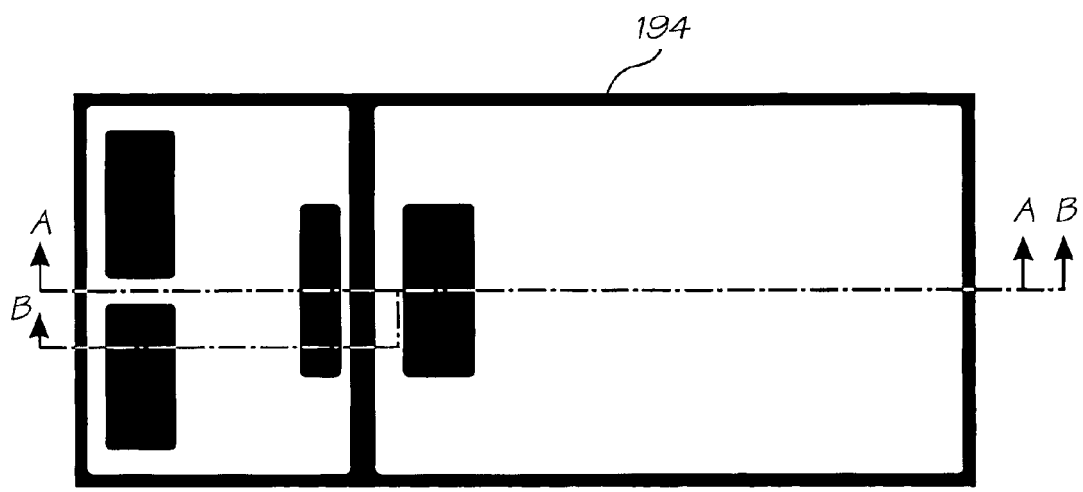
FIG. 36 shows a mask used for etching the layer of titanium.

At this stage, approximately 1 micron of resist material is spun on to the layer 190. A mask 194 shown in FIG. 36 is then used together with a photolithographic process to form an image on the layer 190.

The resist material is a positive resist material. It follows that the image can be deduced from the mask 194.

The photolithographic process is a 1.0 micron stepper process or better. Further, the mask bias is +0.3 micron and the alignment of the mask is +/−0.25 micron.

The resist material is developed and undergoes a soft bake process. The titanium layer 190 is etched down to the preceding sacrificial layer 182. The sacrificial layer 182 was hard baked. This hard baking process inhibits the sacrificial layer 182 from being etched together with the titanium layer 190.

The etching process is planar and the lithographic process is therefore not critical.

The resist material is then removed with a wet stripping process. This ensures that the sacrificial material is not also removed. Thereafter, the front side of the structure is cleaned in oxygen plasma, if necessary. It should be noted that oxygen plasma cleaning would strip the resist material. It follows that the oxygen plasma stripping or cleaning should be limited to 0.2 micron or less.

The result of this process can clearly be seen in FIGS. 34 and 35. In particular, the layer 76 of the vias 74, the layer 88 of the effort member 62, the layer 94 of the fulcrum member 58 and the layer 96 of the resistance member 60 is formed. Further, the end walls 30, 102 and the side walls 32, 100 are developed fully to have a base portion, which is effectively a laminate of TiAN and titanium, and a remaining portion of titanium.

Figure 37:
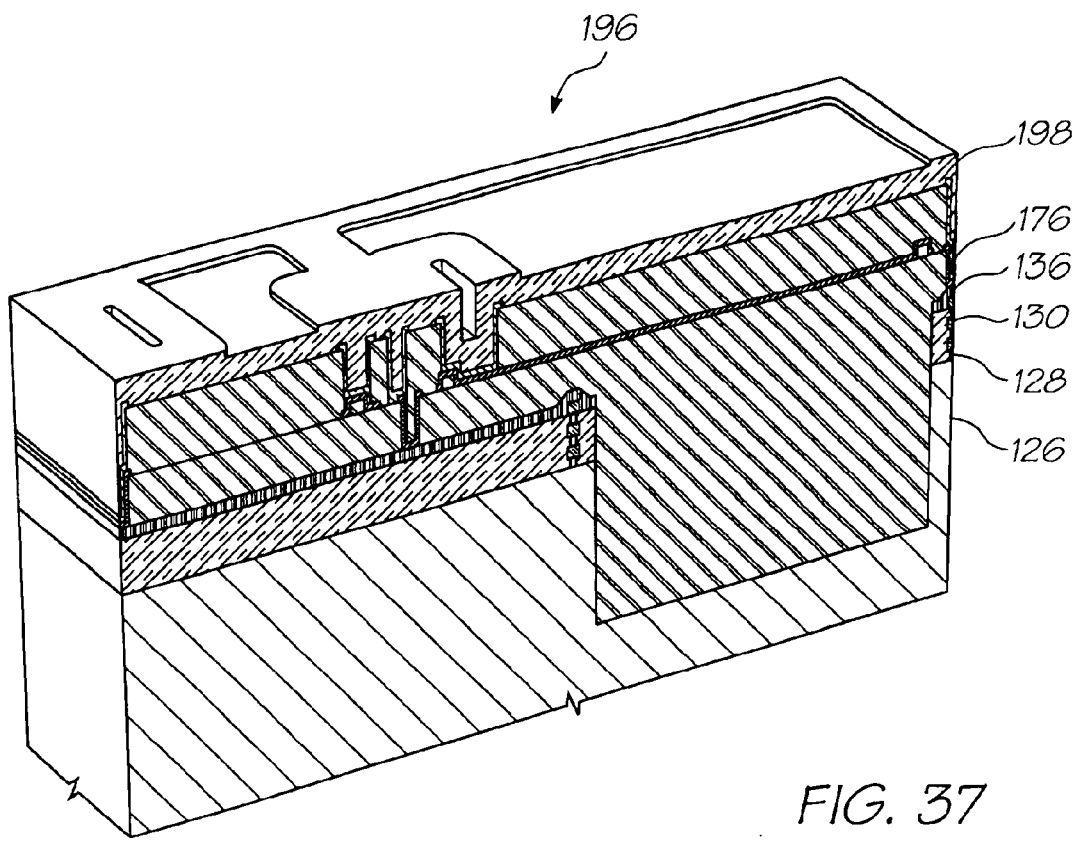
FIG. 37 shows a three-dimensional sectioned view taken through A—A in FIG. 36 with a layer of dielectric material deposited on the etched layer of titanium.
Figure 38:
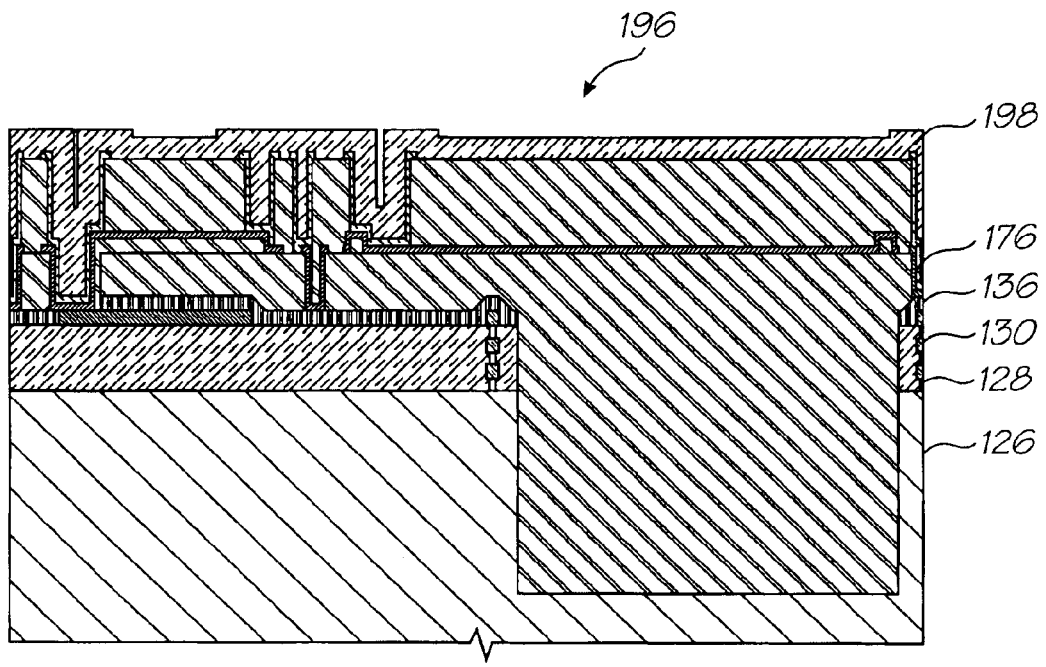
FIG. 38 shows a side sectioned view of the stage of FIG. 37.

In FIGS. 37 and 38, reference numeral 196 generally indicates the structure 192 with a layer 198 of low temperature silicon nitride deposited thereon. With reference to the preceding figures, like reference numerals refer to like parts, unless otherwise specified.

At this stage, the layer 198 of low temperature silicon nitride having a thickness of approximately 1.5 microns is deposited through ICP chemical vapor deposition (CVD) on the structure 192 at approximately 200 degrees Celsius.

Any suitably strong, chemically inert dielectric material could be used instead. The material properties of this layer are not especially important. The silicon nitride does not need to be densified. It follows that high temperature deposition and annealing are not required. Furthermore, this deposition process should be approximately conformal but this is not particularly critical. Still further, any keyholes that may occur are acceptable.

Figure 39:
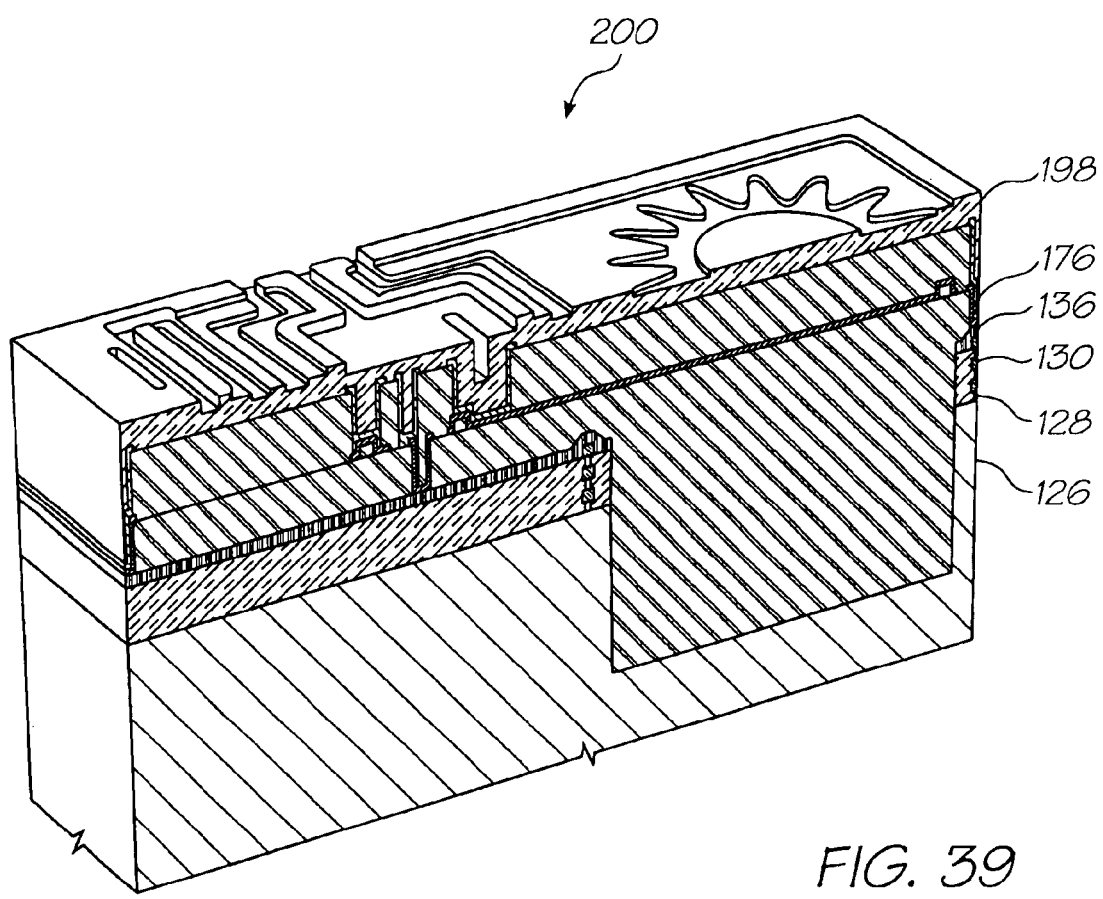
FIG. 39 shows a three-dimensional sectioned view through A—A in FIG. 41 of the stage of FIG. 37 after a selective etching of the dielectric layer.
Figure 40:
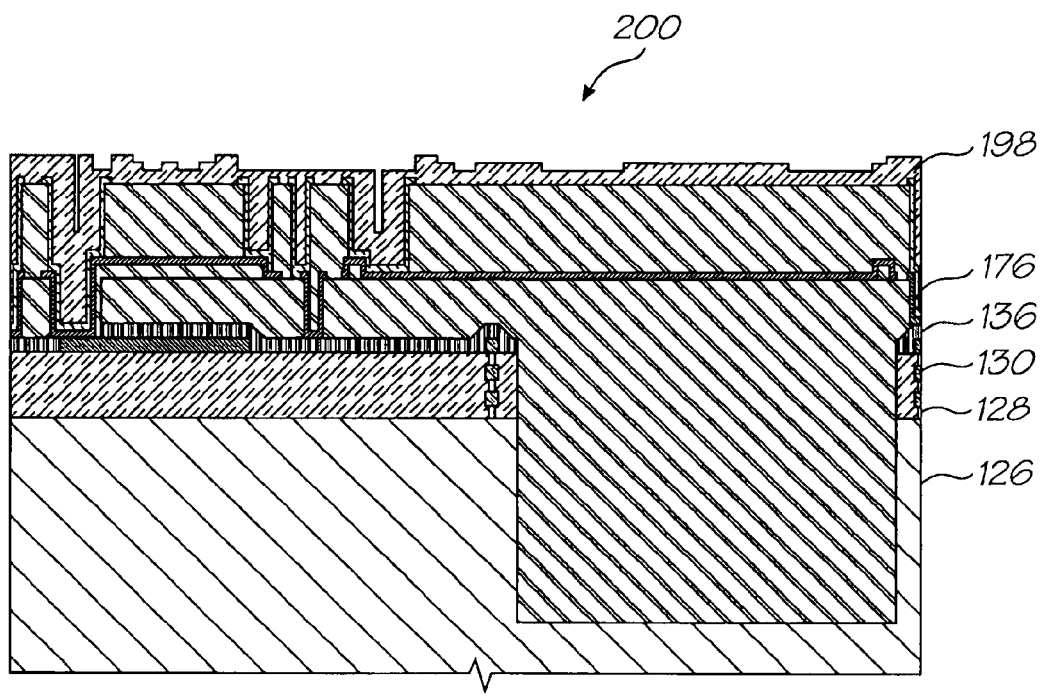
FIG. 40 shows a side sectioned view through B—B in FIG. 41 of the stage of FIG. 39.

In FIGS. 39 and 40, reference numeral 200 generally indicates the structure 196 with a preliminary etch carried out on the layer 198. With reference to FIGS. 10 to 38, like reference numerals refer to like parts, unless otherwise specified.

Figure 41:
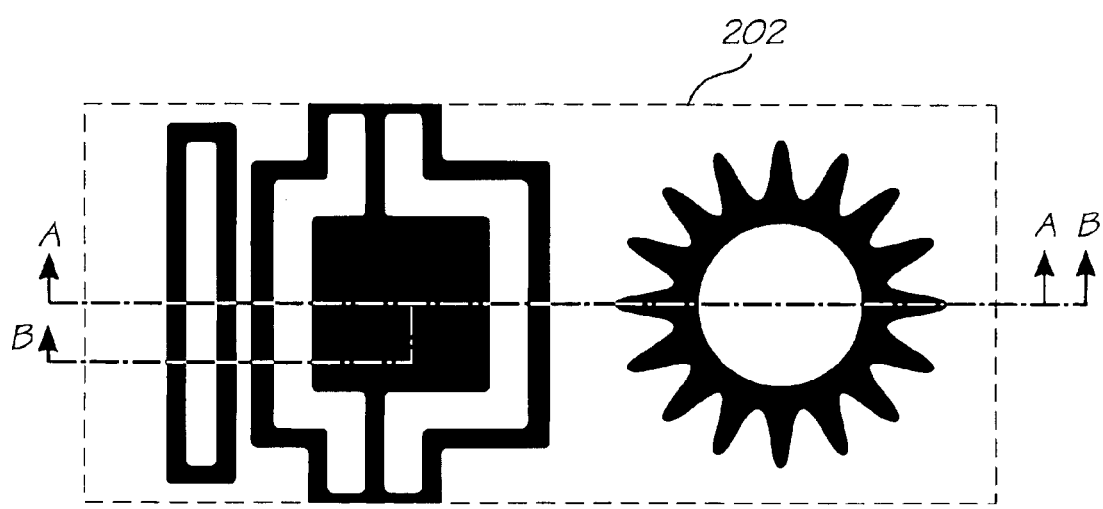
FIG. 41 shows a mask used in the selective etching of the dielectric layer.

In this step, approximately 1 micron of resist material is spun on to the structure 196. A mask 202 in FIG. 41 is used together with a photolithographic process to form an image of the recesses 44, the slotted opening 106 and the gaps 108, 110 on the resist material.

The photolithographic process is a 1.0 micron stepper process or better. Further, the mask bias is +0.2 microns and the alignment is +/−0.25 microns.

The resist material is developed and undergoes a soft bake process. The resist material is a positive resist material and it follows that the resultant image can be easily deduced from the mask 202.

The layer 204 of silicon nitride is then etched to a depth of 0.6 micron +/−0.2 micron so that the recesses 44 are formed. Further, recesses corresponding to the slotted opening 106 and the gaps 108, 110 are also formed.

It will be appreciated that this process is an initial stage in the formation of the roof wall 36, the lever arm 54, the torsion members 56 and the cover 104.

The resist material is wet or dry stripped.

Figure 42:
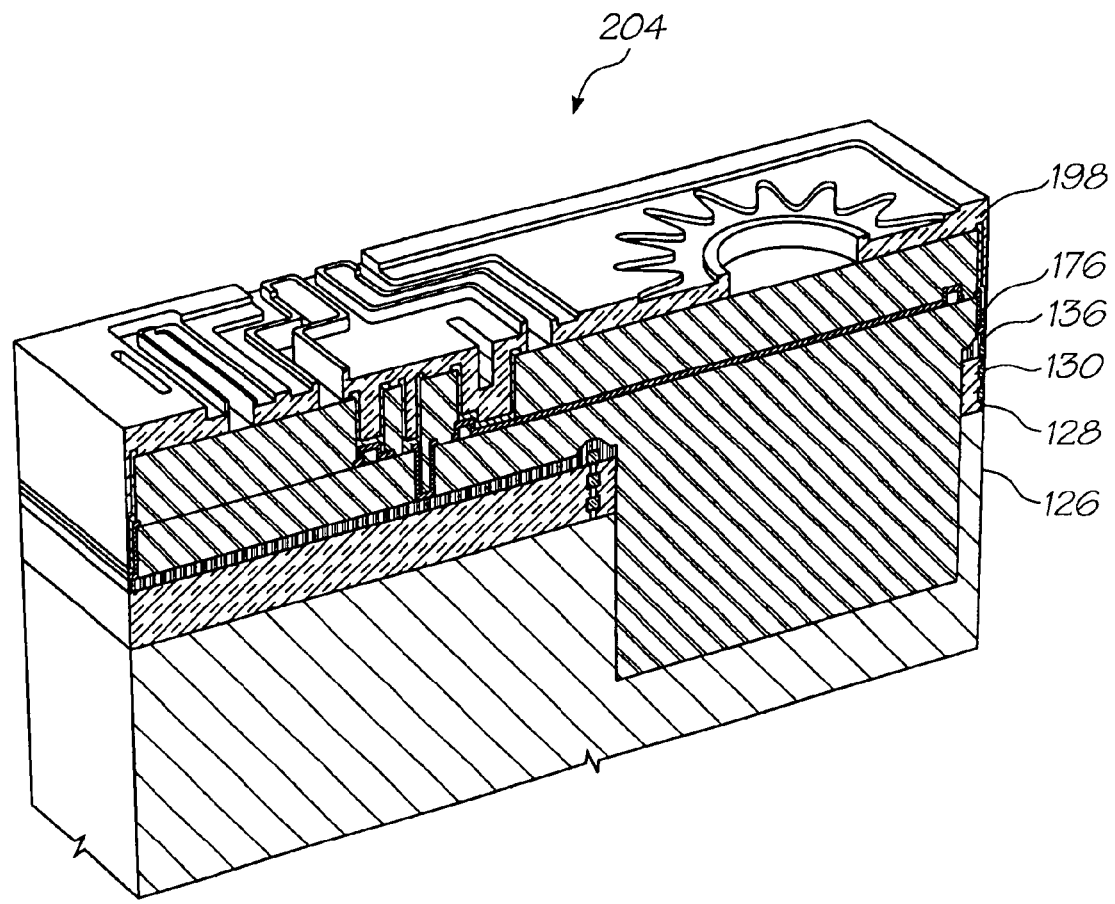
FIG. 42 shows a three-dimensional sectioned view through A—A in FIG. 44 of the stage of FIG. 39 after a further selective etching of the dielectric layer.
Figure 43:
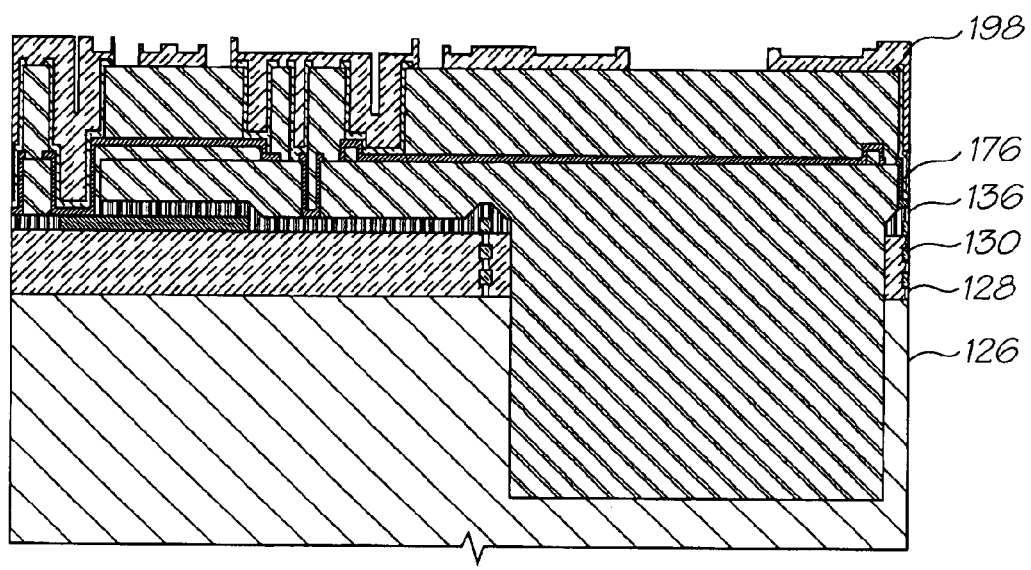
FIG. 43 shows a side sectioned view through B—B in FIG. 44.

In FIGS. 42 and 43, reference numeral 204 generally indicates the structure 200 subsequent to the layer 204 of silicon nitride being subjected to a further etching process. With reference to FIGS. 10 to 41, like reference numerals refer to like parts, unless otherwise specified.

Figure 44:
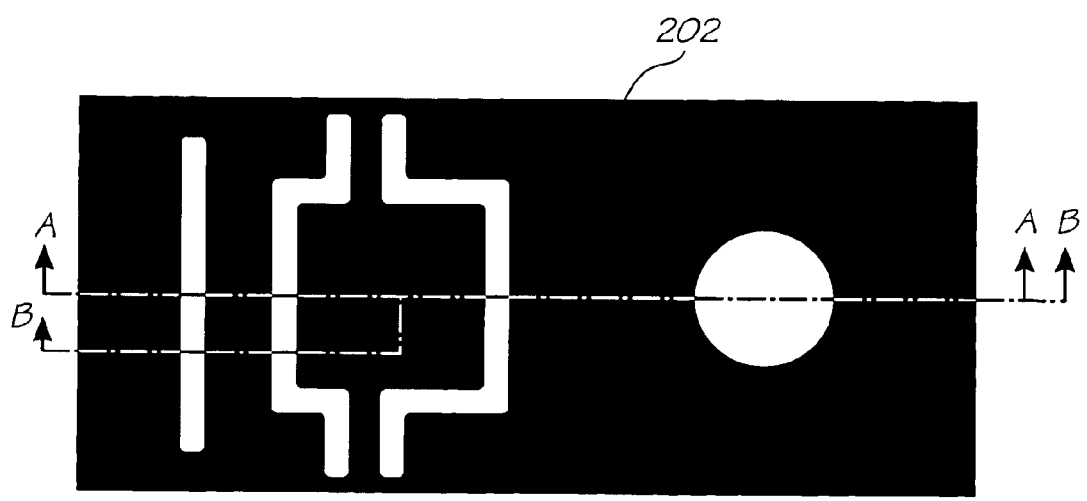
FIG. 44 shows a mask used for the further selective etching of the dielectric layer.

At this stage, approximately 1.0 micron of resist material is spun onto the structure 200. A mask 206 shown in FIG. 44 is used together with a photolithographic process to form an image on the layer 204.

The resist material is a positive resist material. It follows that the image can easily be deduced from the mask 206.

The photolithographic process is a 0.5 micron stepper process or better. Further, the mask bias is +0.2 micron and the alignment is ±0.15 micron.

The image is then developed and undergoes a soft bake process. Subsequently, a timed etch of the silicon nitride takes place to a nominal depth of approximately 1.5 microns.

The result of this process is clearly indicated in FIGS. 42 and 43. As can be seen, this process results in the definition of the cover 104 with the slotted opening 106, the lever arm 54, the torsion members 56, the gaps 108, 110 bounded by the ridges 112 and the ink ejection port 40 bounded by the nozzle rim 42.

It is to be noted that alignment with the previous etch is important.

At this stage, it is not necessary to strip the resist material.

Figure 45:
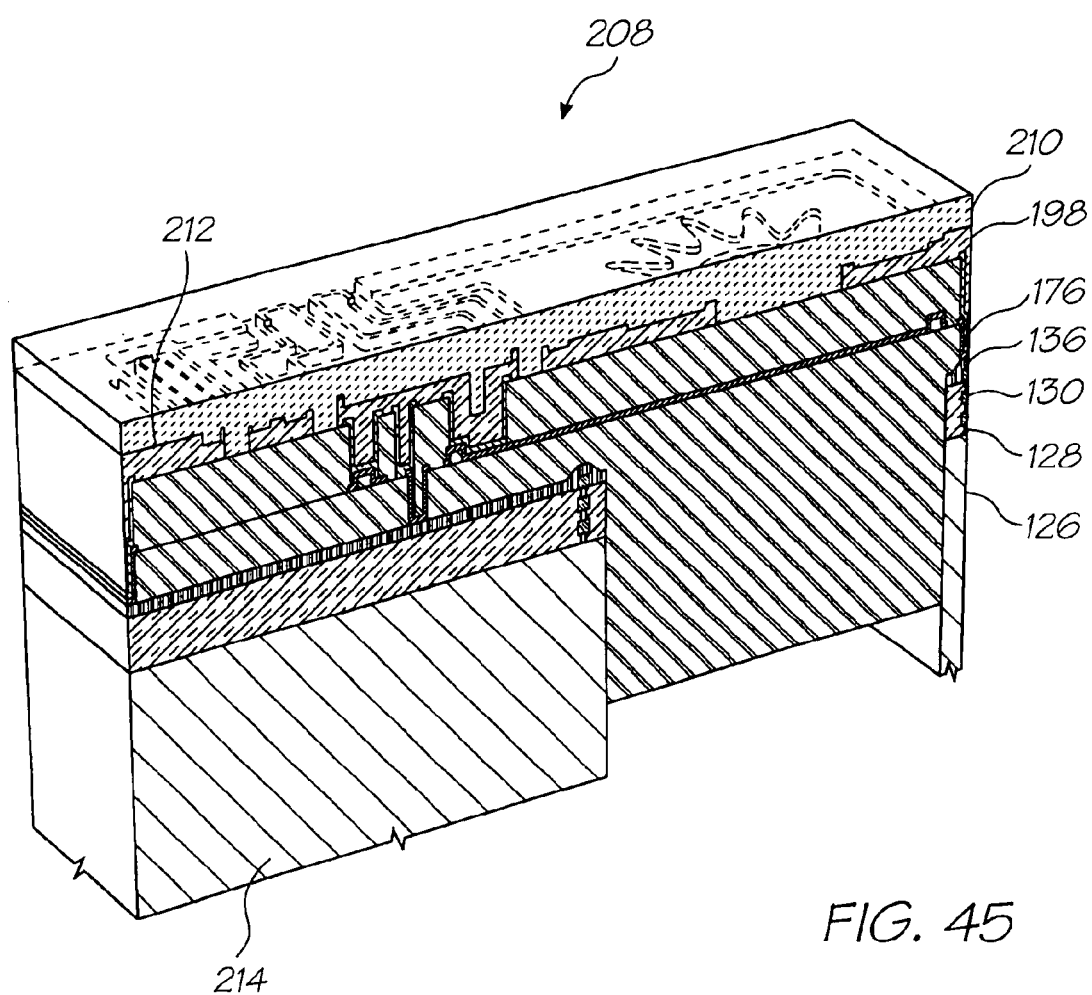
FIG. 45 shows a three-dimensional sectioned view through A—A in FIG. 47 of the stage of FIG. 42 with a resist layer deposited on the dielectric layer and subsequent to a preliminary back etching of the wafer substrate.
Figure 46:
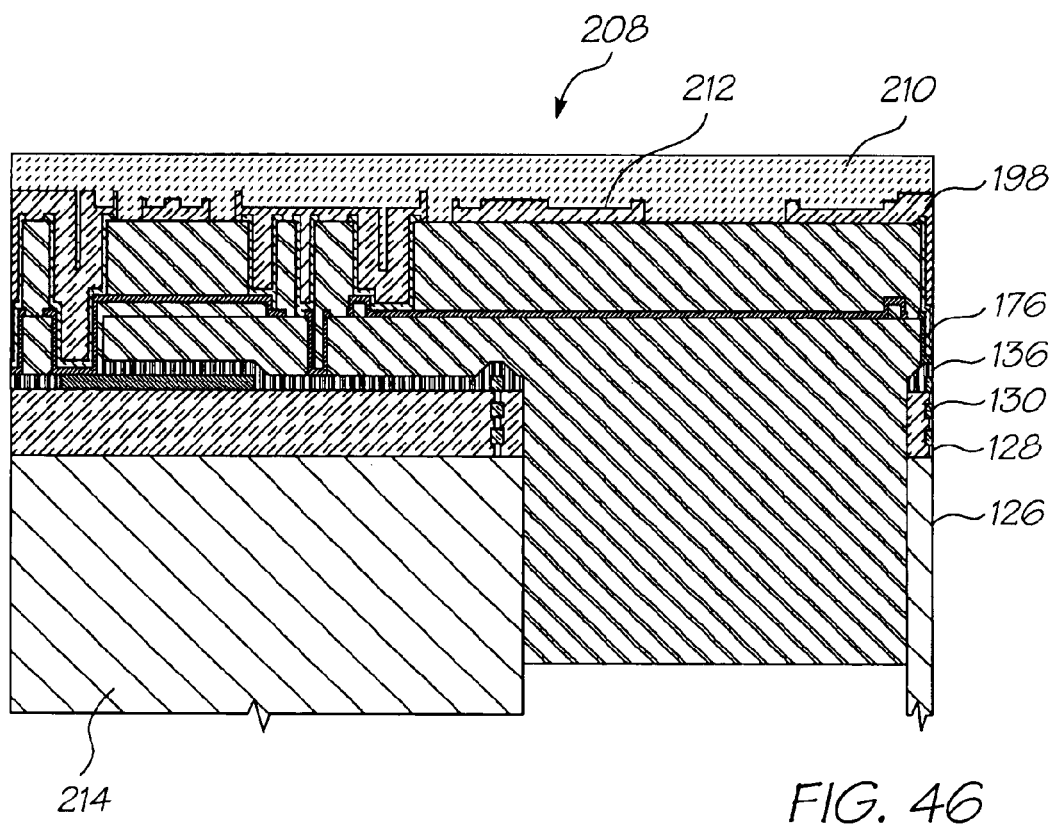
FIG. 46 shows a side sectioned view taken through B—B in FIG. 47 of the stage of FIG. 45.

In FIGS. 45 and 46, reference numeral 208 generally indicates the structure 204 with the wafer substrate 126 thinned and subjected to a back etching process.

During this step, 5 microns (+/−2 microns) of resist 210 are spun on to a front side 212 of the structure 204. This serves to protect the front side 212 during a subsequent grinding operation.

A back side 214 of the CMOS wafer substrate 124 is then coarsely ground until the wafer 126 reaches a thickness of approximately 260 microns. The back side 214 is then finely ground until the wafer 126 reaches a thickness of approximately 260 microns. The depth of the grinding operations depends on the original thickness of the wafer 126.

After the grinding operations, the back side 214 is subjected to a plasma thinning process that serves to thin the wafer 126 further to approximately 200 microns. An apparatus referred to as a Tru-Sce TE-200INT or equivalent can carry out the plasma thinning process.

The plasma thinning serves to remove any damaged regions on the back side 224 of the wafer 108 that may have been caused by the grinding operations. The resultant smooth finish serves to improve the strength of the printhead chip 12 by inhibiting breakage due to crack propagation.

At this stage, approximately 4 microns of resist material is spun on to the back side 214 of the wafer 126 after the thinning process.

Figure 47:
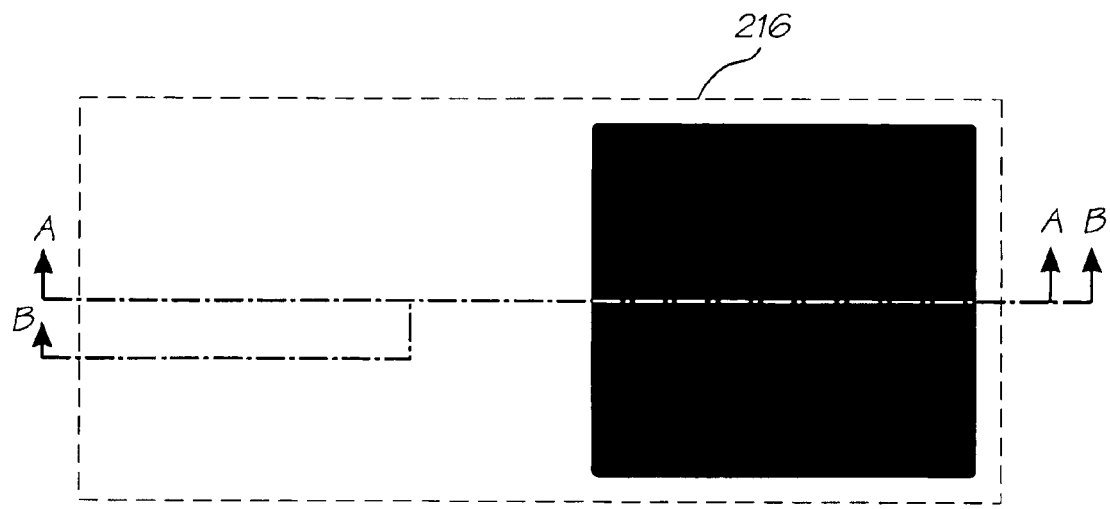
FIG. 47 shows a mask used for the preliminary back etching of the wafer substrate.

A mask 216 shown in FIG. 47 is used to pattern the resist material. The mask bias is zero microns. A photolithographic process using a suitable backside mask aligner is then carried out on the back side 214 of the wafer 126. The alignment is +/−2 microns.

The resultant image is then developed and softbaked. A 190 micron, deep reactive ion etch (DRIE) is carried out on the back side 214. This is done using a suitable apparatus such as an Alcatel 601E or a Surface Technology Systems ASE or equivalent.

This etch creates side walls which are oriented at 90 degrees +/−0.5 degrees relative to the back side 214. This etch also serves to dice the wafer. Still further, this etch serves to expose the sacrificial material positioned in the ink inlet channel 22.

Figure 48:
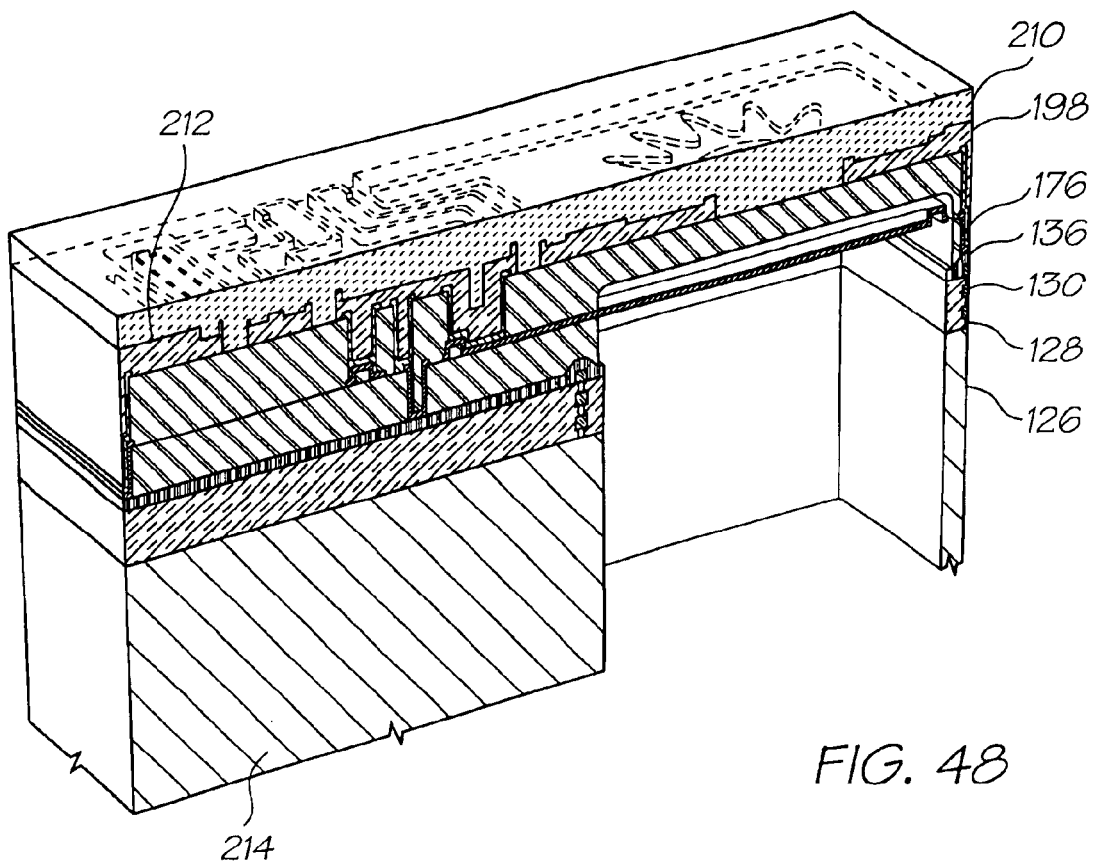
FIG. 48 shows a three-dimensional sectioned view taken through A—A in FIG. 47 of the stage of FIG. 45 subsequent to a secondary back etching of the material of the first sacrificial layer positioned in an inlet and nozzle chamber of the nozzle arrangement.
Figure 49:
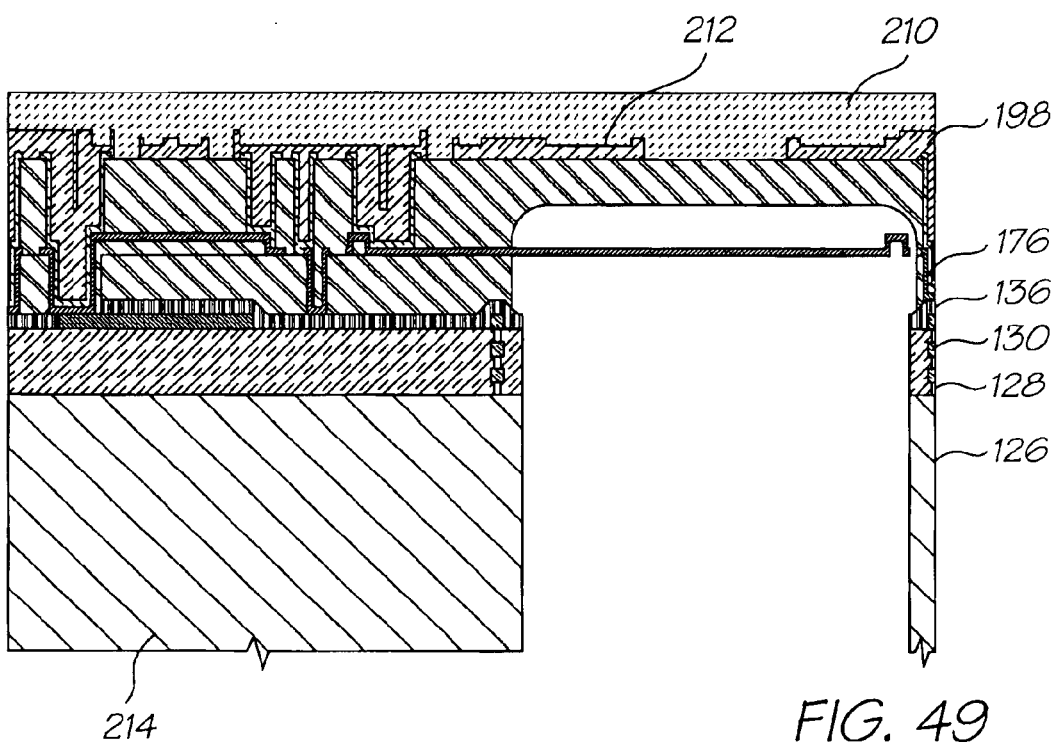
FIG. 49 shows a side sectioned view taken through B—B in FIG. 47 of the stage of FIG. 48.

In FIGS. 48 and 49, reference numeral 218 generally indicates the structure 208 subjected to an oxygen plasma etch from the back side 214.

In this step, an oxygen plasma etch is carried out to a depth of approximately 25 microns into the ink inlet channel 22 to clear the sacrificial material in the ink inlet channel 22 and a portion of the sacrificial material positioned in the nozzle chamber 38.

Etch depth is preferably 25 microns +/−10 microns. It should be noted that a substantial amount of over etch would not cause significant problems. The reason for this is that this will simply meet with a subsequent front side plasma etch.

Applicant recommends that the equipment for the oxygen plasma etch be a Tepla 300 Autoload PC or equivalent. This provides a substantially damage-free "soft" microwave plasma etch at a relatively slow rate being 100 to 140 nanometers per minute. However, this equipment is capable of etching 25 wafers at once in a relatively low cost piece of equipment.

The oxygen should be substantially pure. The temperature should not exceed 140 degrees Celsius due to a thermally bonded glass handle wafer. The time taken for this step is approximately 2.5 hours. The process rate is approximately 10 wafers per hour.

Figure 50:
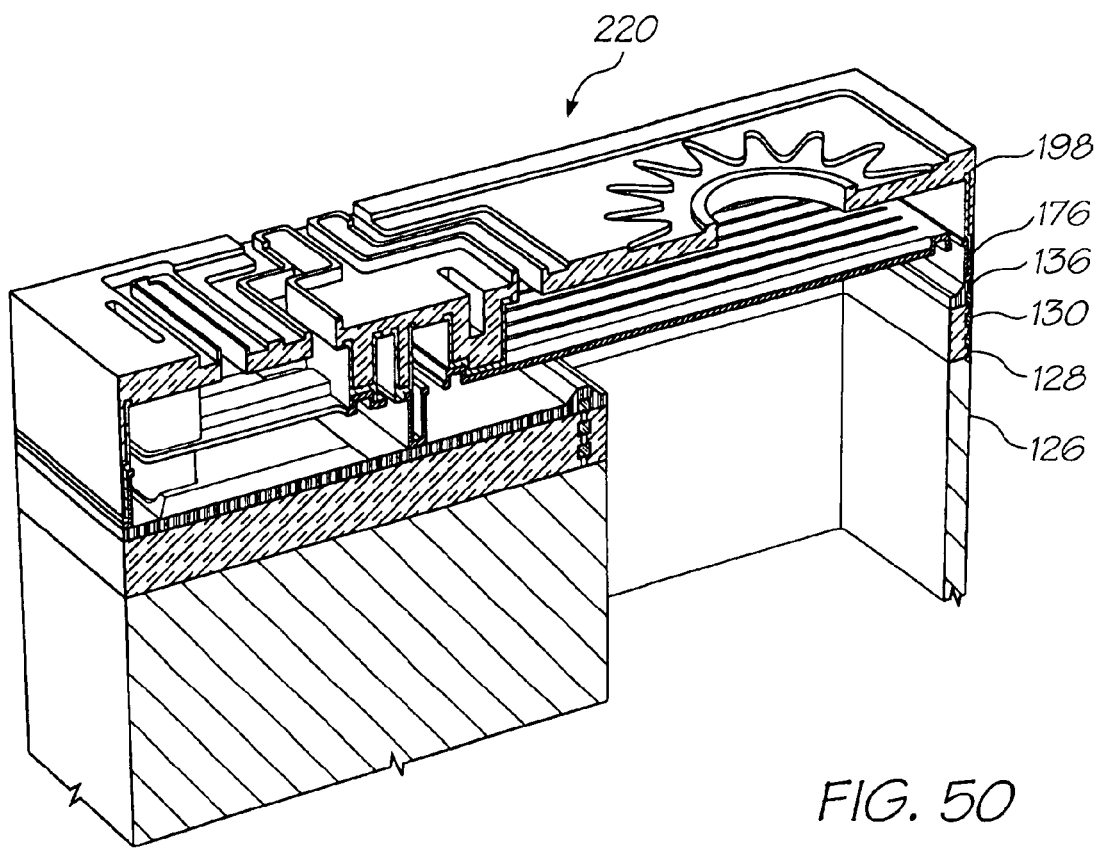
FIG. 50 shows a three-dimensional sectioned view through A—A in FIG. 47 of the stage of FIG. 48 with all the sacrificial material and resist material removed.
Figure 51:
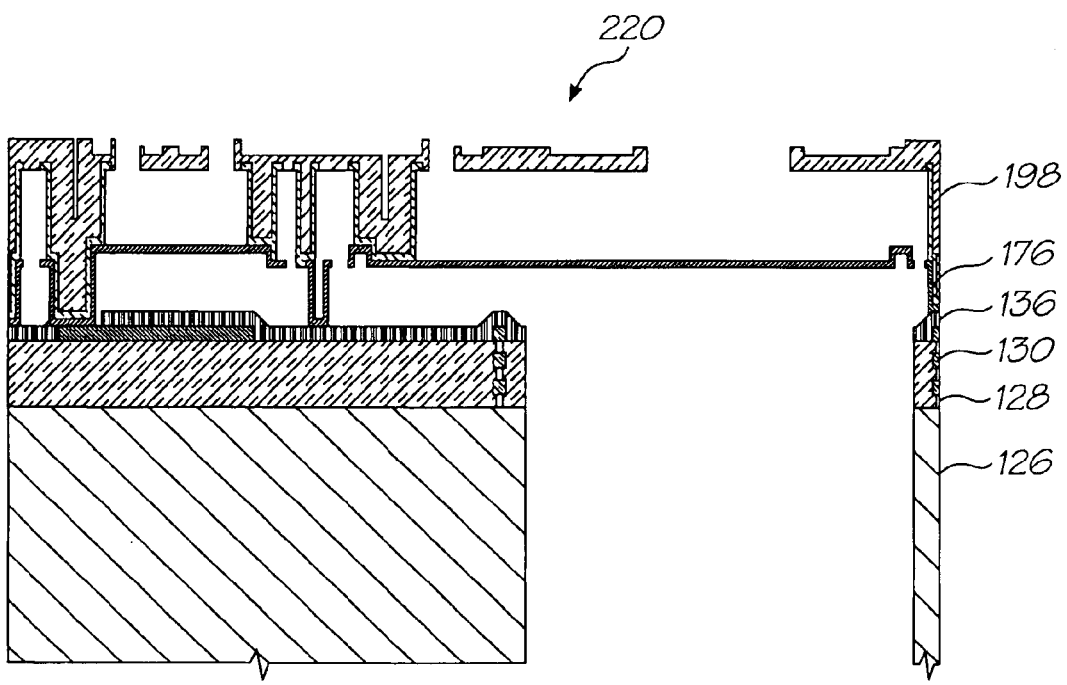
FIG. 51 shows a side sectioned view taken through B—B in FIG. 47 of the stage of FIG. 50.
Figure 52:
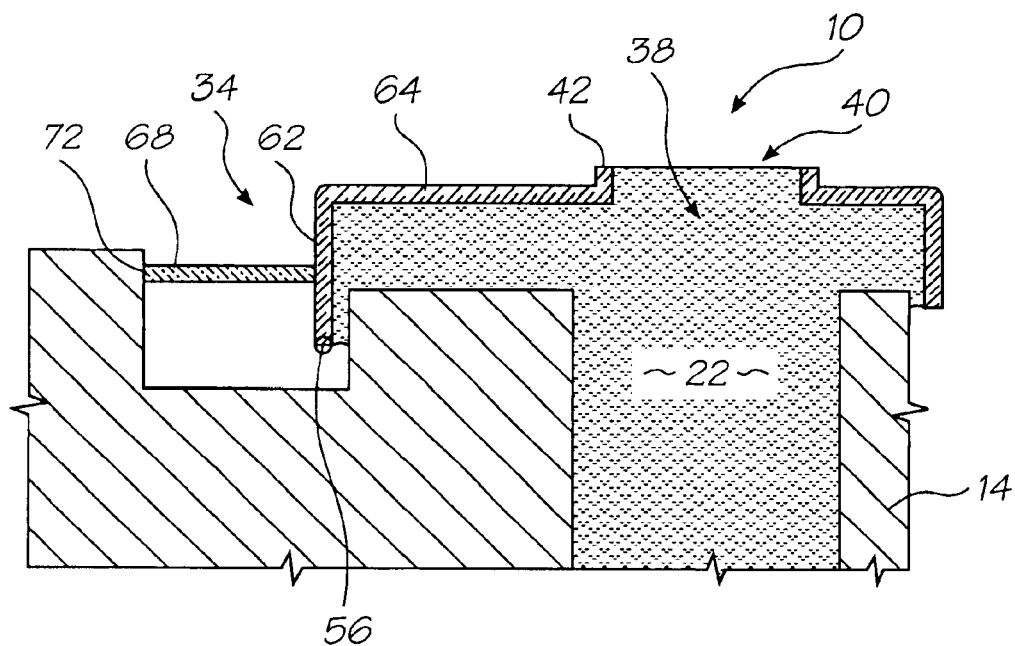
FIG. 52 shows a simplified sectional view of an alternative embodiment of a nozzle arrangement according to the invention, in a quiescent state.

In FIGS. 50 and 52, reference numeral 220 generally indicates the structure 220 subsequent to a front side oxygen plasma etch carried out on the structure 218.

During this step, the structure 218 is subjected to an oxygen plasma etch from the front side 212 to a depth of 20 microns +/−5 microns. Substantial over etch is not a problem, since it simply meets with the previous etch from the back side 214. It should be noted that this etch releases the MEMS devices and so should be carried out just before guard wafer bonding steps to minimize contamination.

The Applicant recommends that an apparatus for this step be a Tepla 300 Autoload PC or equivalent. This provides a substantially damage-free "soft" microwave plasma etch at a relatively slow rate of between 100 and 140 nanometers per minute. The slow rate is countered by the fact that up to 25 wafers can be etched at once in a relatively low cost piece of equipment.

The oxygen should be substantially pure. The temperature should not exceed 160 degrees Celsius. The process takes about two hours and the process rate is approximately 12.5 wafers per hour.

During testing, the nozzle arrangement 10 was actuated with approximately 130 nanojoules for a duration of approximately 0.8 microseconds.

It was found that the ejection of ink occurred approximately 4 microseconds after the start of an actuation pulse. Drop release is caused by the active return of the actuator to the quiescent position as the actuator cools rapidly.

Figure 53:
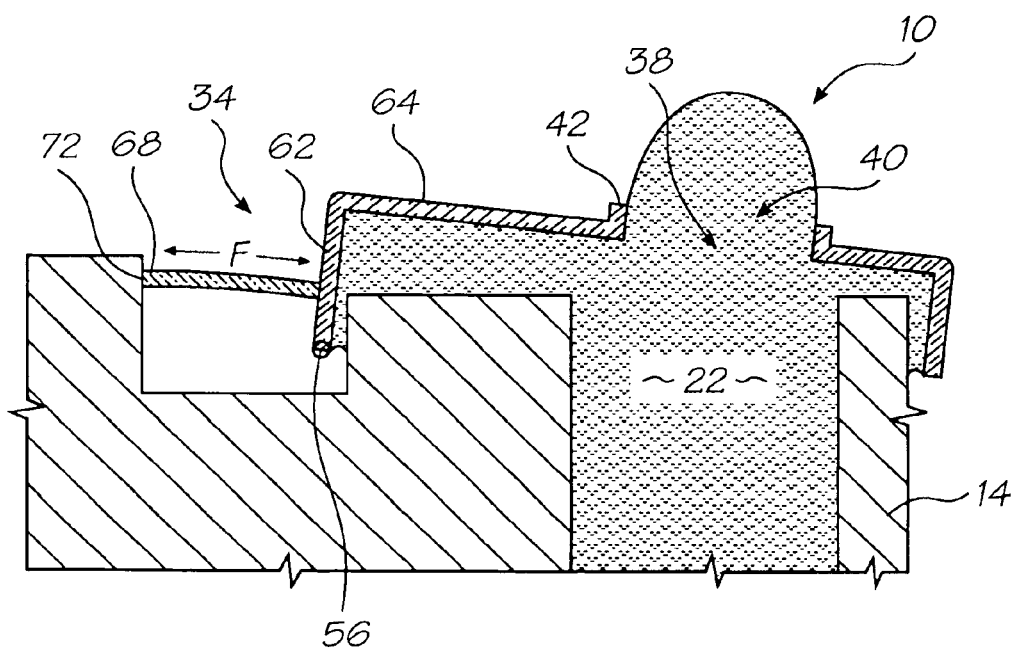
FIG. 53 shows a simplified sectional view of the nozzle arrangement of FIG. 52 during actuation.

Turning to FIGS. 52 and 53, there is shown an alternative embodiment of the invention in which reference numerals used in other Figures are used to indicate like features. It will be appreciated that FIGS. 54 and 55 are schematic in nature, in order to illustrate the operation of the embodiment in its simplest form, and are not intended to represent actual structural details, including the specifics of construction type and materials choice. Those skilled in the art will be able to determine appropriate construction techniques and material choices by referring to the main embodiment and other construction techniques described in the cross-referenced documents.

The embodiment of FIGS. 52 and 53 differs from the earlier embodiment in that the paddle 64 is not disposed within the nozzle chamber 38. Rather, the paddle 64 forms a roof of the nozzle chamber 38, with the ink ejection port 40 being disposed in the paddle. The thermal actuator 68 extends between the anchor point 72 and effort member 62. The torsion members 56 are disposed beneath the effort member.

In use, when current is supplied to the actuator 68, it self-heats, which in turn causes linear expansion. The expansion causes a force F to be applied between the anchor point 72 and the effort member 62. The torsion members 56 constrain translational movement of the paddle, so the force F is converted into rotational movement of the paddle 64. As shown in FIG. 53, the rotation of the paddle 64 causes ink in the chamber to be compressed by downward movement of the paddle 64 at the nozzle end. This, in turn, causes ink to bulge out of the ink ejection port 40, in the same way as was described in relation to FIGS. 4 and 5.

Drive current through the actuator 68 is then cut off. As expansion of the actuator stops, the rotation of the paddle stops, and is then reversed towards the quiescent position shown in FIG. 52 as the actuator 68 cools. This causes a bulging, thinning, and breaking of the ink extending from the nozzle as shown in FIGS. 6 and 7, such that an ink droplet 92 continues to move away from the ink ejection port 40.

Refill takes place in a similar way to that described in the main embodiment, and the nozzle arrangement is then ready to fire again.

Although the invention has been described with reference to a number of specific embodiments, it will be appreciated by those skilled in the art that the invention can be embodied in many other forms.

What is claimed is:

1. A nozzle arrangement for an inkjet printhead, the nozzle arrangement including:
   (a) a nozzle chamber for holding ink;
   (b) a dynamic structure having: a lever arm; and an operative portion in fluid communication with the nozzle chamber, the dynamic structure being mounted for rotational movement about a pivot axis with respect to the nozzle chamber upon actuation;
   (c) a fluid ejection port in fluid communication with the nozzle chamber for allowing ejection of ink upon movement of the dynamic structure relative to the nozzle chamber during actuation;
   (d) an actuator extending between the lever arm and an anchor point, and having a predetermined length in a quiescent state prior to actuation;
      the nozzle arrangement being configured such that, upon actuation, the length of the actuator changes such that the actuator applies a force between the lever arm and the anchor to cause rotational movement of the dynamic structure, which in turn causes ejection of the ink from the fluid ejection port.

2. A nozzle arrangement according to claim 1, wherein the fluid ejection port is formed in a roof portion that at least partially defines the nozzle chamber, the nozzle arrangement being configured such that, upon actuation, the operative portion of the dynamic structure is moved relative to the fluid ejection port, thereby causing ejection of the ink from the fluid ejection port.

3. A nozzle arrangement according to claim 1, in which:
   the operative portion of the actuator defines a roof portion that at least partially defines the nozzle chamber; and
   the fluid ejection port is formed in the roof portion;
   wherein the nozzle arrangement is configured such that, upon actuation, the roof portion, and thereby the fluid ejection port, are moved relative to the nozzle chamber, thereby causing the ink to be ejected from the fluid ejection port.

4. A nozzle arrangement according to claim 1, configured such that, upon return of the actuator to a quiescent position after actuation and ejection of the ink through the fluid ejection port, the nozzle chamber is refilled with the ink via an inlet channel.

5. A nozzle arrangement according to claim 4, wherein the nozzle chamber is refilled with ink from the inlet channel due to a reduction in pressure within the nozzle chamber caused by surface tension of a concave ink meniscus across the fluid ejection port after a ink ejection.

6. A nozzle arrangement according to claim 1, wherein the actuator is a thermal actuator.

7. A nozzle arrangement according to claim 6, wherein the actuator comprises at least one active beam that is resistively heatable by means of an electric current, thereby to generate the force by way of thermal expansion.

8. A nozzle arrangement according to claim 1, further including a lever arm support connected between a substrate and the lever arm.

* * * * *